(12) United States Patent
Lightfoot et al.

(10) Patent No.: US 8,193,651 B2
(45) Date of Patent: Jun. 5, 2012

(54) METHOD AND APPARATUS FOR OCEAN ENERGY CONVERSION, STORAGE AND TRANSPORTATION TO SHORE-BASED DISTRIBUTION CENTERS

(76) Inventors: Fred M. Lightfoot, Bremerton, WA (US); Robert Eugene Milligan, Maple Valley, WA (US); Terry Ivan Eade, Port Orchard, WA (US); William Carl Morchin, Auburn, WA (US)

( * ) Notice: Subject to any disclaimer, the term of this patent is extended or adjusted under 35 U.S.C. 154(b) by 192 days.

(21) Appl. No.: 12/802,818

(22) Filed: Jun. 15, 2010

(65) Prior Publication Data

US 2010/0320759 A1    Dec. 23, 2010

Related U.S. Application Data

(60) Provisional application No. 61/269,129, filed on Jun. 22, 2009.

(51) Int. Cl.
*F03B 13/10* (2006.01)
*H02P 9/04* (2006.01)

(52) U.S. Cl. ............................. 290/42; 290/53
(58) Field of Classification Search .......... 290/42, 290/43, 53, 54; 60/506
See application file for complete search history.

(56) References Cited

U.S. PATENT DOCUMENTS

| | | | | |
|---|---|---|---|---|
| 917,411 | A * | 4/1909 | Casella et al. ................ | 60/500 |
| 1,169,356 | A * | 1/1916 | Sanderson ..................... | 60/498 |
| 1,647,025 | A * | 10/1927 | Stich ............................ | 60/498 |
| 1,818,066 | A * | 8/1931 | Jouy ............................. | 60/498 |
| 4,077,213 | A * | 3/1978 | Hagen .......................... | 60/500 |
| 4,118,932 | A * | 10/1978 | Sivill ............................ | 60/500 |
| 4,210,821 | A * | 7/1980 | Cockerell ..................... | 290/53 |
| 4,249,084 | A * | 2/1981 | Villanueva et al. ............ | 290/53 |
| 4,319,454 | A * | 3/1982 | Lucia ........................... | 60/506 |
| 4,389,843 | A * | 6/1983 | Lamberti ...................... | 60/507 |
| 4,781,023 | A * | 11/1988 | Gordon ......................... | 60/506 |
| 5,710,464 | A * | 1/1998 | Kao et al. ..................... | 290/53 |
| 6,476,511 | B1 * | 11/2002 | Yemm et al. .................. | 290/42 |
| 7,315,092 | B2 * | 1/2008 | Cook ............................ | 290/53 |
| 7,525,207 | B2 * | 4/2009 | Clidaras et al. .............. | 290/43 |
| 8,008,792 | B2 * | 8/2011 | Gray ............................. | 290/42 |
| 2008/0018114 | A1 * | 1/2008 | Weldon ......................... | 290/53 |
| 2009/0084296 | A1 * | 4/2009 | McCormick .................. | 114/26 |
| 2011/0057448 | A1 * | 3/2011 | Page ............................. | 290/53 |

* cited by examiner

*Primary Examiner* — Nicholas Ponomarenko

(57) ABSTRACT

A fleet of vessels attached together longitudinally (rows), and transversely (columns) and operating in unison convert wave energy to electrical energy which is stored in either a chemical or electrical form. The vessels when detached from the fleet provide transportation to coastal or by navigable waterway ports of call for distribution to market centers. Both wind wave and swell wave energy conversion is performed by use of the differential motion between the vessels. Means are provided for the energy conversion systems to adapt to changes in wave direction, wave length, amplitude, and phase. Such vessels are self powered for off shore or inland waterway navigation, either singularly or in multiples, with which to deliver energy to other sea going vessels or to land based ports of call. Two or more of such vessels are capable of using the energy of waves during the delivery process. The fleet can maintain a designated geographical location by dynamic positioning. Alternatively, the fleet may maintain its designated position by moorage of a designated centrally located vessel in the fleet to a permanent anchoring system when operating at appropriate depths.

7 Claims, 18 Drawing Sheets

METHOD AND APPARATUS FOR OCEAN ENERGY CONVERSION, STORAGE AND TRANSPORTATION TO SHORE-BASED DISTRIBUTION CENTERS

CROSS REFERENCES TO RELATED APPLICATIONS

This application claims priority from provisional patent application Ser. No. 61/269,129 titled Method and apparatus for ocean energy conversion, storage and transportation to shore-based distribution centers filed Jun. 22, 2009, the teaching of which are incorporated herein by reference

REFERENCES

A. U.S. Patent Documents

1. U.S. Pat. No. 4,249,084 Villanueva, et al., Scheme for harnessing hydroundulatory power, Feb. 3, 1981.
2. U.S. Pat. No. 4,878,452 Regan, et al., Quick-release mooring apparatus for floating vessels, Nov. 7, 1989.
3. U.S. Pat. No. 6,476,511 Yemm, et al., Floating apparatus and method for extracting power from sea waves, Nov. 5, 2002.
4. U.S. Pat. No. 7,215,036 Gehring, Current power generator, May 8, 2007.
5. U.S. Pat. No. 7,331,174 Welch, Jr., et al., Buoyancy pump power system, Feb. 19, 2008.
6. U.S. Pat. No. 4,077,213 Hagen; Glenn E., Wave driven generator, Mar. 7, 1978.
7. U.S. Pat. No. 4,392,349 Hagan; Glenn E., Spaced apart wave generator float array, Jul. 12, 1983.
8. U.S. Pat. No. 4,563,591 Jones; Dedger, Wave driven engine, Jan. 9, 1986.
9. U.S. Pat. No. 4,389,843 Lamberti; John, Water wave energy transducer, Jun. 28, 1983.
10. U.S. Pat. No. 4,446,378 Martinez Parra; Jose, System for the generation of electrical energy by utilizing the kinetic energy of seawater, May 1, 1984.
11. U.S. Pat. No. 4,686,377 Gargos; Gary, System for generating power from waves, Aug. 11, 1987.
12. U.S. Pat. No. 5,132,550 McCabe, Richard P., Wave powered prime mover, Jul. 21, 1992.
13. U.S. Pat. No. 7,378,561 Olah, George, A method for producing methanol from atmospheric air, May 22, 2008.
14. U.S. Pat. No. 4,134,023 Salter; Stephen H., Apparatus for use in the extraction energy from waves on water, Jan. 9, 1979.
15. U.S. Pat. No. 7,322,189 Talya; Shashishekara Sitharamarao, Bose; Sumit, Wide bandwidth farms for capturing Wave energy, Jan. 29, 2008.
16. U.S. Pat. No. 3,959,094 Steinberg, Meyer, Electrolytic Synthesis of Methanol from $CO_2$, May 25, 1976.
17. U.S. Pat. No. 4,197,421 Steinberg, Meyer, Synthetic carbonaceous fuels and feedstocks, Apr. 8, 1980.
18. U.S. Pat. No. 7,075,189, Heronemus, Phyllis R and Heronemus, William, Offshore wind turbine with multiple wind rotors and floating system, Jul. 11, 2006.
19. United States Patent Documents 4,098,084, Cockerell, Christopher, Apparatus for extracting energy from wave movement of the sea, Jul. 4, 1978.
20. United States Patent Application 20090084296, McCormick, Wave Powered Energy Conversion System, Apr. 2, 2009.

B. Technical References

21. National Research Council and National Academy of Engineering. Opportunities, Costs, Barriers, and R&D Needs.
22. Reza, Faziollah, M., Introduction to Information Theory; p. 305-308, McGraw-Hill Electrical and Electronic Engineering Series.
23. Widrow, B., Hoff, M., Jr., Adaptive Switching Circuits, IRE Wescon Record, part 4, 1960, pp. 96-104.
24. Widrow, Bernard, et al., Adaptive Noise Cancelling: Principles and Applications, Proceedings of the IEEE, vol. 63, No. 12, December 1975. Pp. 1692-1716.
25. Wikipedia: key words, "matched filters, ambiguity functions, pulse compression, signal convolution/correlation" http://en.wikipedia.org/wiki/Matched_filter, Jun. 7, 2009.
26. Olah, George, et al., Beyond Oil and Gas: The Methanol Economy. WILEY-VCH Verlag Gmbh & Co. KGaA. $2^{nd}$ Reprint, October 2006.
27. McCool, John M. "The Basic Principles of Adaptive Systems with Various Applications". NUC TN 837. Naval Undersea Center, San Diego Calif., September 1972.
28. Dornean, Marina, TOPA, Marina, et al., System Identification with Least Mean Square Adaptive Algorithm, Interdisciplinary in Scientific International Conference, Romania, November 2007. (Key words, LMS, HDL, system identification)
29. Hershberger, Steve, W9GR., Digital Signal Processing for the Radio Amateur, QST Amateur Radio Relay League, September, 1992.
30. Wikipedia, key words; "Spectral density", "Power spectral density", http://en.wikipedia.org/wiki/Spectral_density, Jun. 7, 2009.
31 McCormick, Michael E., Ocean Wave Energy Conversion, Dover Publications, Inc., Mineola, N.Y., 2007.

BACKGROUND OF THE INVENTION

1. Field of the Invention

The present invention relates to the collection, storage, and transportation and distribution of clean and renewable energy from fleets of vessels located in off-shore, ocean locations. Specifically, energy obtained from wind waves and ocean swells is converted to forms suitable for transportation to coastal and inland ports accessible by navigable waterways.

2. Background of the Prior Art

The use of floats to capture the largely untapped energy available from ocean waves has been known for many years. Most of these inventions were developed to provide either a direct linear linkage to a mechanical interface to do specialized tasks such as turning a shaft or piston, or pumping water to obtain a hydraulic head, etc. See U.S. Pat. No. 4,249,084, [1] 1,471,222. These devices tended to be mechanically complex and unsuited to efficiently couple energy over the broad spectrum of ocean wavelengths encountered in practical applications such as in U.S. Pat. Nos. 1,818,066, 1,169,356 and 1,647,025.

The more successful applications utilized wave conversion in conjunction with hydraulic systems with servomechanisms and turbo-electrical generators to adapt to a wider range of sea conditions including wave amplitudes and spectral wavelengths such as Hagen, [6], [7], Cockrell, [19] and Talya [15]. These patents are good examples of using efficient resonating systems in their designs. Talya uses various means of tuning groups of buoy type floats when given commands from a central computer. Each group is tuned to a specific band of frequencies. Hagan uses arrays of floats, each float within an array being resonant by virtue of its physical dimensions. Each float dimension encountering a wave front is a half wavelength at a design frequency. No adjustments are needed to passively resonate to a particular wavelength. Relative motion between, adjacent floats provide the kinetic energy that is transformed to an electrical form. It also accommodates a non-linear conversion characteristic thus accommodating a significant range of wave amplitudes.

McCabe, U.S. Pat. No. 5,132,421 (12) uses three barges for which the relative motion between the central barge and the outer barges or pontoons are used to pump high-pressure water to shore with which electricity is generated or water desalinated. Resonance is adjusted by changing the inertia of the system and damping response of the central barge. Damping is accomplished by underwater damping plates mounted on long shafts and with the other ends mounted to the central barge. The damping plates are screwed up or down the shafts as required. Inertia is changed by varying the ballast in the outer pontoons. Each deployment requires a priori knowledge of a location and adjustment to the predominant wavelengths at a site.

McCormick, in his patent application 20090084296 (20) uses three barges, each of different length, the middle barge has a length that is less than half of the forward barge length to achieve relatively large angular displacements between the two. The third barge is the longest of the three to provide directional stability to the system so that it faces into the incident waves. The motion of the hinged barges is used to drive pumps that draw in salt water and pump the water at high pressure to a reverse osmosis desalination plant that is located on shore or on the rear barge. The motion of the forward and rear barges is enhanced by using U-shaped tubes containing ballast water that have resistance valves to ballast water flow. The amount of ballast and the dimension of the tubes and control of the valves are used to adjust the resonant frequency of the system. The emphasis of the design is desalination. And like McCabe the system requires a priori knowledge of a location and adjustment to the predominant wavelengths at a site.

Perhaps the most mechanically sophisticated WEC in actual use at the present time is that of Yemm, [3]. This system consists of elongated, buoyant cylinders which form an articulated structure. The segmented structure has length which is of the order of the longest wavelength to be processed. Power is extracted from the relative rotational movement of cylinders induced by cross-coupling between perpendicular pairs of joints. A means is provided to vary the yaw angle to track the mean wave direction.

Heronemus, et al, [18] teach us the virtue of removing $CO_2$ from the sea and air by using electricity generated at sea with wind driven generators and show us the possibility of storing hydrogen in the form of methane (or other hydrocarbon form) for its ultimate transport to land based facilities.

Functional Goals of the Invention

The functional goals of the invention are as follows: 1) convert renewable energy from the resources of the open ocean to a form useful in reducing dependence on petroleum sources; 2) use common facilities and personnel to perform energy conversion, storage, transportation and distribution; 3) contribute to the depletion of $CO_2$ in the atmosphere; and 4) produce fuel products at a cost comparable to other alternative fuels and products 5) avoid competition for coastal space with other renewable fuel operations, avoidance of environmental destruction and visual impairment; and 6) avoid premature obsolescence of existing energy storage distribution infrastructure.

Comparison of the Invention Design Approach with Prior Art

Prior art has been directed to specialized conversion systems that were not required to be operated in areas beyond the reach of direct access to an electrical grid. For example, Hagan Salter [4], Talya and Yemm designs that are not suitable for producing substantial alternate energy fuels or transportation to remote markets without the use of electrical grids. These inventions also are restricted to coastal locations with lesser potential energy than the outer banks or open ocean locations. There are many competing renewable energy applications requiring coastal access like wind turbine farms and tidal current facilities which put practical limits on the number of future hydrokinetic system sites that may be available to meet the nation's needs. A new approach to wave energy conversion has been in the invention herein described that achieves efficiencies equivalent to that of stationary collecting installations but employs standard physical dimensions for vessels that can be and are built in large numbers and thus achieve an economy of scale.

Two conversion approaches are considered: 1) successive conversions to electrical, molecular hydrogen ($H_2$) and a liquid hydrocarbon. The preferred hydrocarbon is methanol which is produced by the reaction of the $H_2$ and carbon dioxide ($CO_2$). The $CO_2$ would be derived from waste gasses ordinarily discharged into the atmosphere by industrial plants, from sea water or the atmosphere. 2) The second method stores the electrical energy directly in ultracapacitors, or an ultracapacitor-lead acid battery hybrid.

The principal component of the hydrocarbon product produced by the first conversion method is hydrogen which has been proposed by many different groups as the "fuel of the future" and the subject of important international initiatives. Future applications are being planned in the transportation, industrial and military markets. Unfortunately, the storage, transportation, and distribution of hydrogen have been cited as the most significant technological barriers to its widespread implementation. Any number of proposed renewable energy systems dependent on locations that are remote from their markets have encountered this problem which, if implemented would result in premature obsolescence of existing infrastructure, safety and environmental problems. The concept described herein provides a means of transition to petroleum independence by providing a number of end-user energy forms, including methanol, methane, ethanol, dimethyl ether (a diesel substitute), gasoline, and jet engine fuel.

Total Cost Considerations

This concept development chosen was to a large extent influenced by the problems of other renewable energy projects. A "well to the tank" approach has been adopted that considers not only the actual capital and operating costs, but the costs of storage, transportation, distribution, infrastructure changes and maintenance. What is often not considered by organizations proposing renewable energy is that of the cost of removal and retirement of permanent structures. Examples of the latter include seabed restoration, scrapping of permanent coastal foundations typical of offshore wind farms, permanent anchoring systems of wave energy conversion (WEC) systems, etc. Disruption of the coastal fishing industry can occur from "wave energy farms" permanently anchored and operating close to shore that require submerged power cables for interconnection to power grids. Of course, the environmental costs are more difficult to measure, but exist. Visual impairment caused by near shore wind farms, intrusion into public recreational facilities, and impairment of waterways by tidal energy systems are detriments to their employment. The system of vessels that comprise the subject design removes many of the previously mentioned obstacles as the operation is performed in open and unobstructed ocean locations, and out of sight of land, if required. It uses self-propelled vessels thus requiring a minimum, or no use of installation and support vessels, which are at present powered by petroleum based fuels. Maintenance actions can be integrated into routine shore side operations. The vessels have a residual value as general transportation vessels at the end of the useful life of the ocean stations. It is noted that the comparative measurement of the true cost of energy between renewable energy systems is highly dependent on where the measurement is taken. At the present time the cost "at the tank" of transportation systems must consider the cost of conversion from grid supplied energy for vehicles using renewable liquid fuel. In addressing comparative costs of renewable energy system, considerable guidance has been obtained from the comprehensive study performed by the National Academy of Engineering and the National Research Council, "The Hydrogen Economy: Opportunities, Costs, Barriers and R & D Needs". [Ref. 21].

SYSTEM DESCRIPTION

Fleet Organization

The present concept employs self-contained fleets of vessels deployed over a large expanse of the Atlantic and Pacific continental shelves. Equivalent locations are feasible in many other locations in the world. These locations are principally determined as a compromise between the most favorable energy conversion locations, and the location of the ports of call for the selected form of energy to be processed. Each vessel performs the combined tasks of energy collection from its WEC system, produces a particular hydrocarbon product or directly stored electricity that permits efficient and safe transportation to land-based locations. Thus, it may be considered a "floating energy factory" plus an integral storage and delivery system.

Figure 1A:
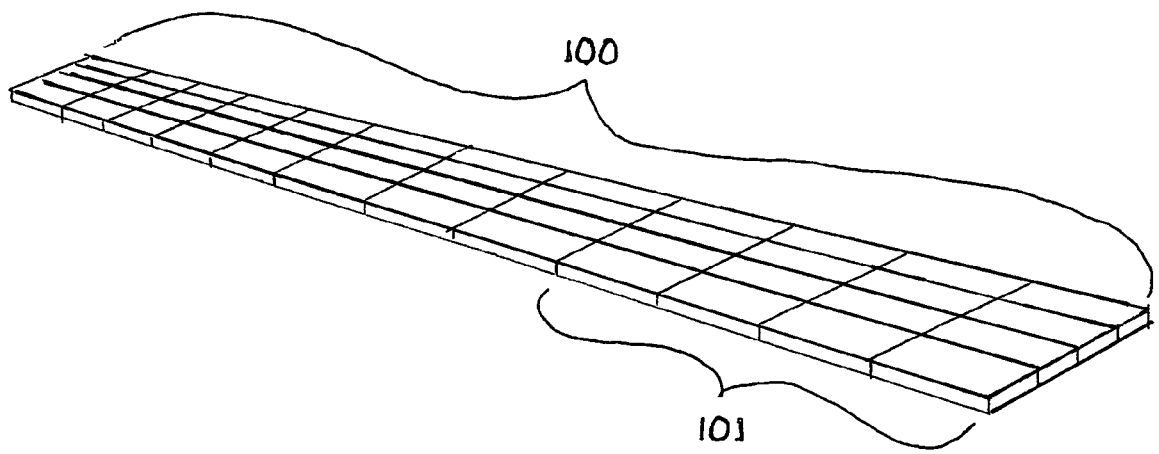
FIG. 1A shows a representation of one of a multiple fleet of vessels assigned to a particular geographical region.
Figure 1B:
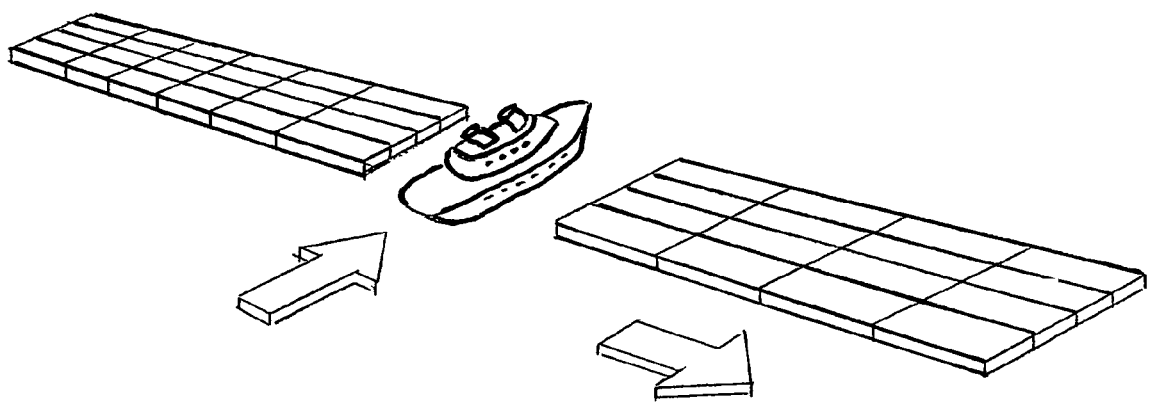
FIG. 1B shows a flotilla that may be separated from the fleet to allow maritime traffic passage as shown.

FIG. 1A is a gross representation of one of a multiple fleet of vessels 100 assigned to a particular geographical region. A hierarchical organization of a single fleet is composed of "flotillas" of 16 vessels 101 which is the smallest unit of a fleet that can be operated in a completely self-contained manner. It comprises the means of performing wave energy conversion (WEC) to successive hydraulic, electrical and finally, chemical form. An exception to the latter would occur when the future state-of-the-art and costs would permit large scale direct electrical storage in a suitable medium. A flotilla has the means of supplying the necessary chemical feedstock to convert the electrical energy to its chemical counterpoint and the successive stages of transportation to shore-based locations and refurbishment of required chemicals from shore-based locations. Flotillas may be separated from the fleet to allow maritime traffic passage as shown in FIG. 1B.

A more flexible designation of groups of vessels may be employed which is not limited to a particular flotilla. This grouping is based on ad hoc arrangements of attached vessels designated as "segments" that are chosen for optimum wave energy conversion. These segments are sized and grouped by wave direction and composition and may utilize as many vessels that may be required to perform the "adaptive resonance" functions to be described. A fleet will continuously select and process these segments for optimum processing until the entire fleet is included in a particular cycle. When this assessment is completed, the process is repeated sequentially ad infinitum.

Wave Energy Conversion to Hydrocarbon Products

Figure 2:
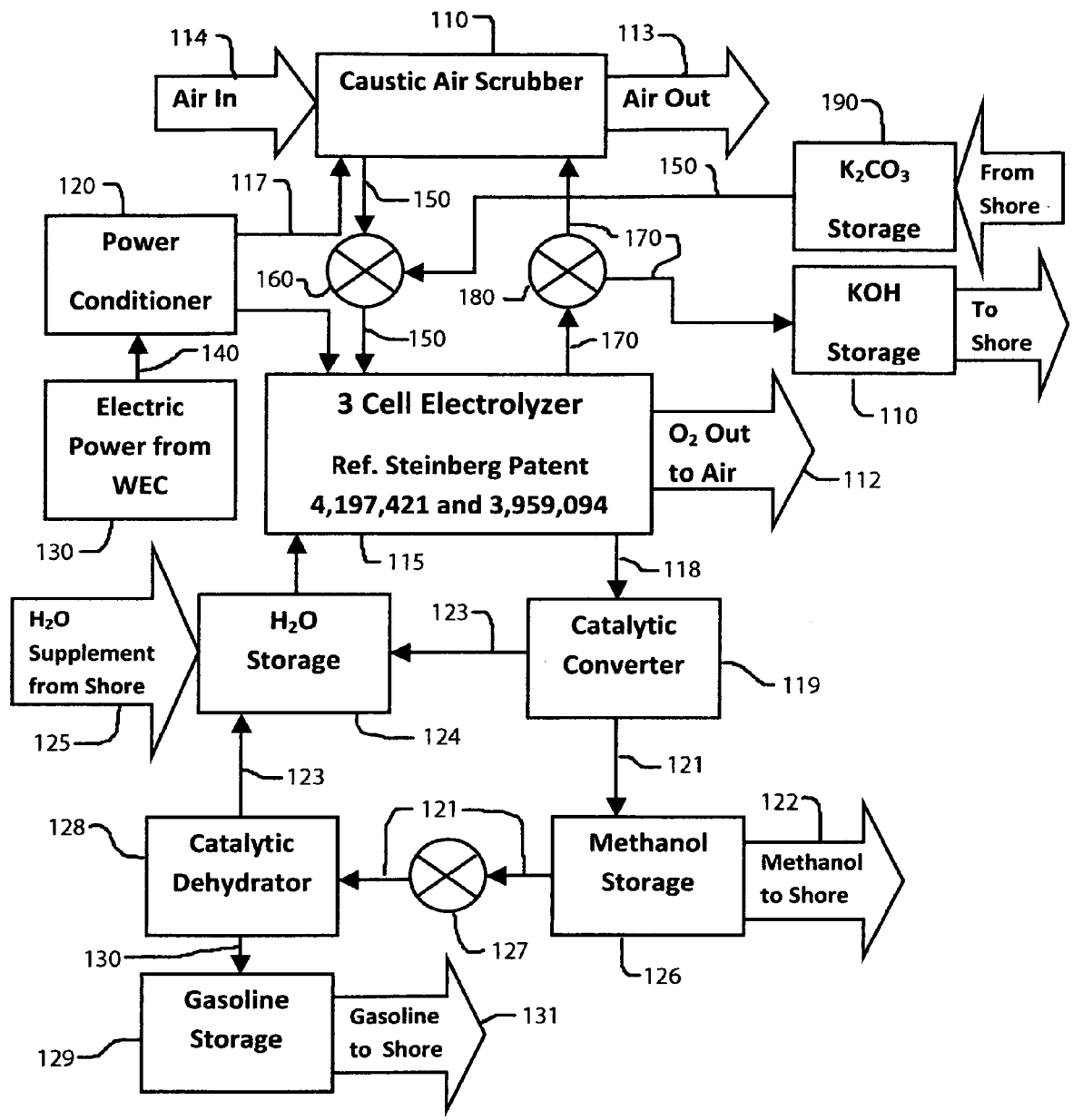
FIG. 2 Illustrates the processes that perform the wave energy conversion to be stored in the form of hydrocarbon products.

FIG. 2 illustrates the processes that perform the wave energy conversion to be stored in the form of hydrocarbon products. In addition, the principal components required for this process are identified. Electric energy obtained from the fleet WEC systems 130 is processed by the power conditioner 120 to the required voltage and current values for the caustic air scrubber 110 and the electrolyzer, 115. This process is well known by practitioners in this field of endeavor and described by Steinberg, references [16] and [17]. Air input and output controls 113 and 114 use suitably designed ducting and shutter operation by those experienced in the field.

An electrolyzer is commonly used in the separation of oxygen and hydrogen from water, and by adding cells to the electrolyzer 115. Steinberg [16] and [17], have extended the concept to perform an efficient means to extract $CO_2$ from either potassium carbonate, $K_2CO_3$, or sodium carbonate, $Na_2CO_3$.

Steinberg further describes a process for combining $CO_2$ and $H_2$ to produce methanol, $CH_3OH$. Olah, [26] has independently developed an equivalent process. Steinberg states [16], [17] that the energy to produce one gallon of methanol is 30.4 kWh if the air scrubber process is used, or 27.7 kWh of electrical energy if sequestered $CO_2$ in a potassium hydroxide, KOH, solution is used.

In the subject embodiment a liquid transfer valve, 160, is used to transfer the sequestered $CO_2$ either from the caustic air scrubber 110, or from a storage Tank, 190. The storage tank 190 is used to store an aqueous solution containing sequestered $CO_2$ transported from shore as an alternative to obtaining it from the caustic air scrubber 110. The storage tank 190 is designed to be capable of service for safe storage under heavy seas and corresponding environmental conditions and is provided as an alternative to obtaining $CO_2$ from air.

The liquid transfer valve 160, which is of reliable construction, is used for controlling the direction of flow of a caustic liquid containing sequestered $CO_2$ by those experienced in the field.

A liquid carrying pipe 150 is used to transfer aqueous sequestered $CO_2$ through the transfer valve 160 to the electrolyzer 115. The valve 160 is set either manually or remotely by either manual electrical initiation or by programmed means. The valve 160 is set so that normal operation is obtained by transferring aqueous $CO_2$ to the electrolyzer 115 from the caustic air scrubber 110. Otherwise, the valve 160 is set to transfer the aqueous $CO_2$ from the $K_2CO_3$ storage tank 190. This particular aqueous $CO_2$ storage chemical is only but one example of such storage method. Experienced people in the field can use different chemicals if suitable for the purpose.

The desired product of the electrolyzer 115 is $CO_2$ and $H_2$ that is piped to a catalytic convertor 119. These chemicals are conducted through a pipe 118 to the Catalytic Convertor 119 for conversion to methanol, $CH_3OH$.

Catalytic converters are common components used in the field of chemistry. Their designs vary to a great degree. The preferred embodiment for this application is that based on Steinberg, [17].

Other products of the electrolyzer 115 are oxygen, $O_2$, and an aqueous solution capable of absorbing $CO_2$ such as potassium hydroxide, KOH or NaOH. Oxygen, $O_2$, is a by product of the preferred three cell electrolyzer 115 and is vented to the air through a pipe and plenum system 112. A liquid transfer valve 180 comprises a design which is capable of reliable construction for controlling the direction of flow of the aqueous solution capable of absorbing $CO_2$ such as KOH or NaOH, whose construction be readily designed and constructed by those experienced in the field. The valve 180 is set either manually or by programmed control. The storage tank 110 is used as an alternate embodiment if air scrubbing is not employed. The design of the KOH storage tank 110 can be suitably designed by persons knowledgeable in the field. A liquid carrying pipe 170 is used to transfer an aqueous solution of KOH or other solution capable of absorbing $CO_2$ gas such as NaOH known to those experienced in the field.

The catalytic convertor 119 has two products, methanol and liquid water. The liquid water is fed through piping 123 to a $H_2O$ storage tank 124 which is used in the electrolyzer 115. Water required by the electrolyzer 115 is supplemented by a supply from the shore 125. Piping 121 is used to transfer methanol from the catalytic converter 119 to a methanol storage tank 126 and on to a catalytic dehydrator 128 for the making of gasoline or other hydrocarbon products. The methanol storage tank 126 may be either a standard, commercially available item or designed and constructed by those experienced in the field for marine use. The transfer function 122 of methanol between the vessels of a fleet may be accomplished through the incorporation of this function in the design of the attachment system 500. Such transfer functions should be done on a vessel separate from that used for transfer of $K_2CO_3$ or $Na_2CO_3$ whose design is suitable for controlling and passing methanol.

A valve 127 is used to transfer methanol between a methanol storage tank 126 and a catalytic D dehydrator 128 whose design is suitable to controlling and passing methanol. Control of this valve 127 will be similar to the control of valve 160 and 170. The catalytic dehydrator 128 is of conventional design and contains a zeolite catalyst to produce gasoline and water or other hydrocarbon products including dimethyl ether (synthetic diesel fuel) and water. The water is fed to the $H_2O$ Storage Tank, 124 and Pipe 123.

The gasoline, or other hydrocarbon product, is moved to a gasoline storage tank, 129. The gasoline storage tank 129 is of conventional design for seagoing applications. A gasoline line 130 suitable for ocean environments is used for the movement of the product from the catalytic dehydrator 128 to the gasoline tank 129.

Movement of gasoline product to shore storage facilities is done by conventional methods used in ocean environments. In this embodiment, it would be used on vessels configured to carry methanol and water, but not $K_2CO_3$ or KOH.

Typical Fleet Deployment
Flotilla Composition

Figure 3A:
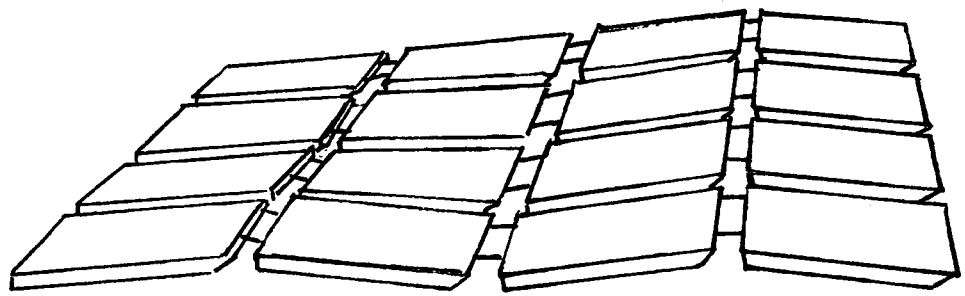
FIG. 3A Represents the composition of a typical Flotilla, which constitutes the smallest division of vessels capable of autonomous operation.

FIG. 3A represents the composition of a typical Flotilla, which as previously stated, constitutes the smallest division of vessels capable of autonomous operation. A 16 vessel flotilla in a 4 by 4 set of rows and columns is a preferred embodiment to make up a collection of vessels to form a fleet. A collection of flotillas may be independently kept on station nearby other flotillas or be connected directly to make up a contiguous fleet. When independently held in nearby formations the fleet may make passage way for other seagoing vessels. When connected directly the fleet may be better adapted to wind and swell wave conditions in addition to be able to aggregate liquid cargo for designated vessels for transportation to ports-of-call, and to distribute electrical energy to fleet vessels as required. Coordination of maintenance, and cargo production activities is another benefit to having a connected flotillas as a mode of operation.

A four "string" set of Type 1 vessels, 334, 335 (quantity of two) and 336, as one embodiment would be used to transport methanol or higher order hydrocarbons to a port and an empty tank for returning with make up water for use in the electrolyzer. Conversely, a four string set of Type 2 vessels 339, 340 (quantity of two) and 341 would be used where onshore sequestered $CO_2$ is available to augment the $CO_2$ obtained from the caustic air scrubber 110. Therefore, this embodiment of a 16 vessel flotilla would consist of a "Methanol Train" and a "$CO_2$ Train" as shown in FIG. 3A.

Typical Flotilla Concept of Operation

Figure 3B:
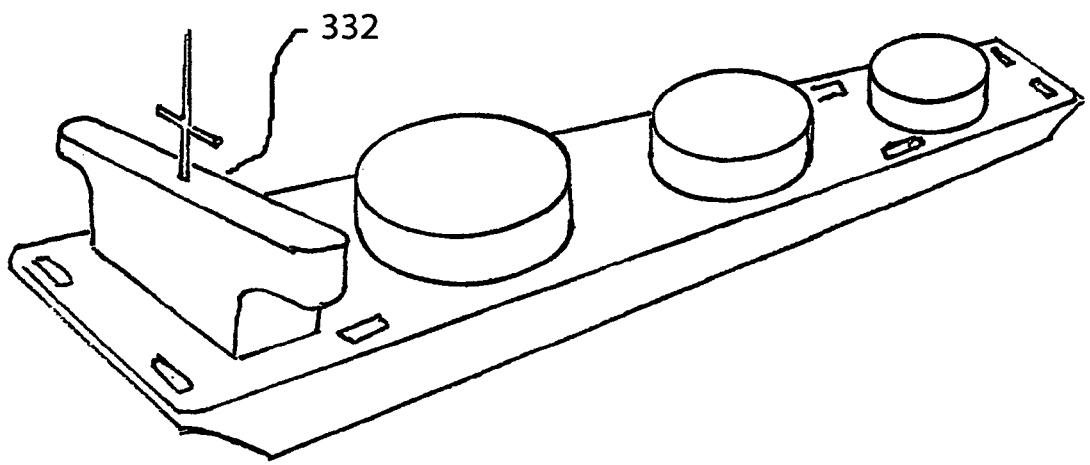
FIG. 3B The lead vessel of a train for transit to ports of call.
Figure 3C:
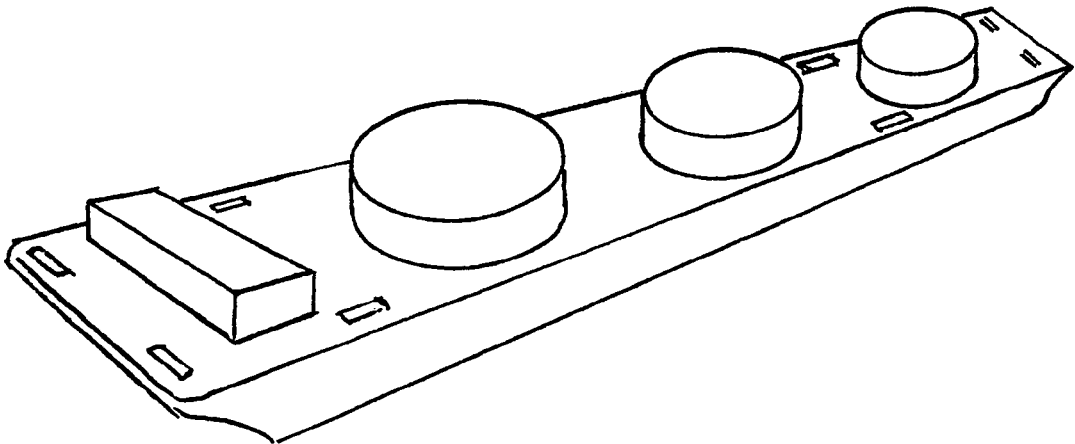
FIG. 3C The trailing vessel of a train for transit to ports of call.
Figure 3D:
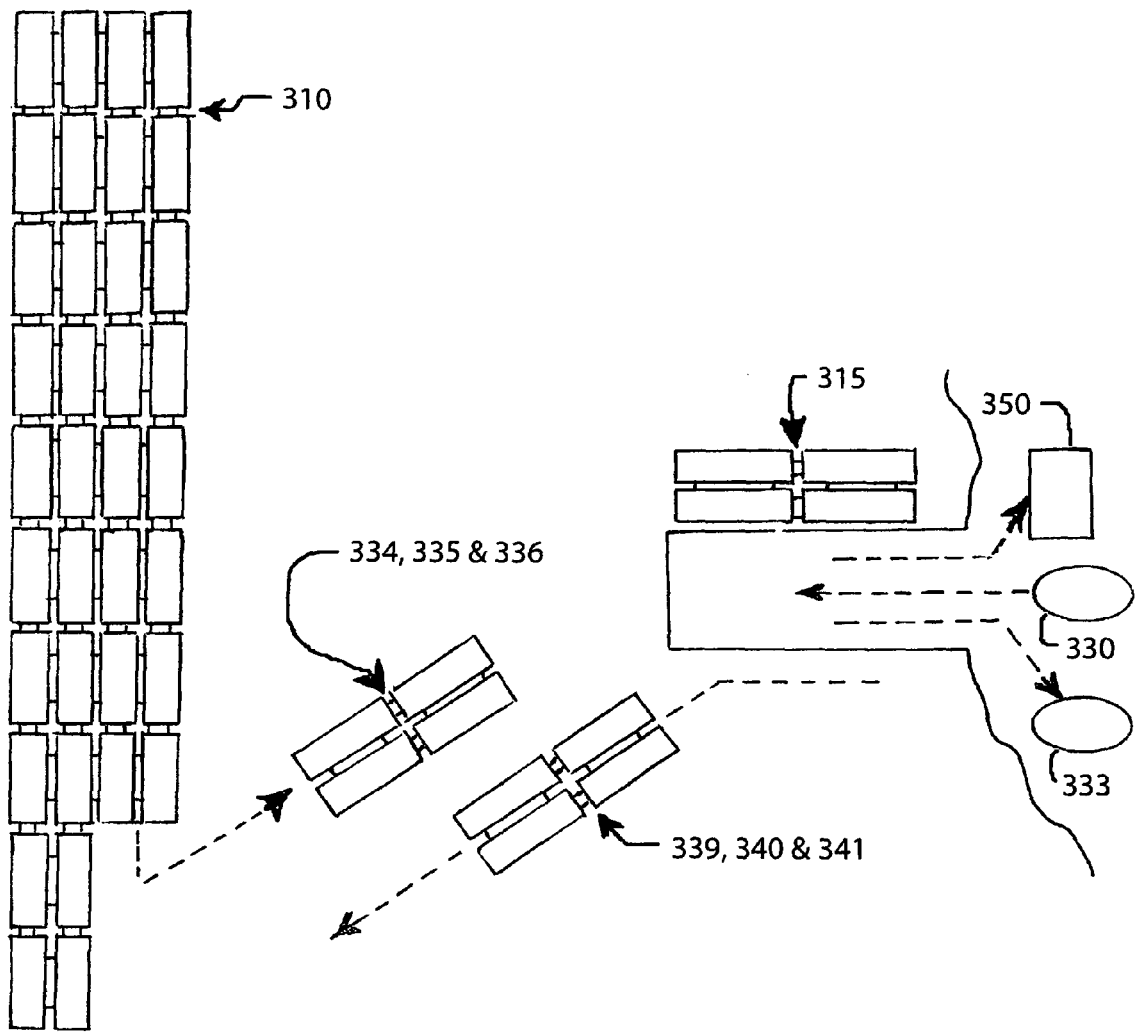
FIG. 3D Illustrates a representation of a cycle of fleet cargo delivery and refurbishment operations using the flotilla configuration typified by FIG. 3A.

FIG. 3D illustrates a representation of a cycle of fleet cargo delivery and refurbishment operations using the flotilla configuration typified by FIG. 3A. The delivery cycle of a train begins at an off-shore station 310 by an assignment of Type 1 vessels 334, 335, 336 for this purpose. Cargo aggregation to the designated vessels by vessel-to-vessel pumping collects the product and delivers it to the designated delivery vessels. This hydrocarbon product is stored at ambient temperature and pressure. The selected vessels which constitute the Methanol Train, would detach themselves from the fleet using the propulsion and maneuvering system 410 and a semi-automatic detachment procedure. The lead vessel FIG. 3B and the trailing vessel FIG. 3C have fully articulating thrusters mounted aft to provide for train propulsion and precision control in these procedures. The designated vessels subsequently re-attach themselves for the transit phase in a primary longitudinal direction consistent with the normal navigational mode but including an additional row(s) to be attached in a transverse coupling formation that would permit energy conversion en-route and thus recover significant quantities of fuel expended for propulsion. The fuel for the transit phase is drawn from the $H_2$ storage tanks (metal hydride) in the propulsion systems 410 of the lead vessel FIG. 3B and the trailing vessel FIG. 3C. This $H_2$ fuel would be used in standard industrial fuel cells packaged for the marine environment that would power the electrical motors of the thruster systems 410.

Since designated vessels are equipped with directionally articulated propulsion, the craft would not need tug assistance in docking and in-harbor maneuvering. Standard tanker facilities should be adequate for liquid product discharge. Vessels complete their transit to the discharge stations 315 at the ports-of-call without assistance from auxiliary vessels. A similar procedure would apply to the embodiment of a "standard vessel" designed for electrical energy storage in ultracapacitor or hybrid ultracapacitor-storage batteries, except that an inverter and conditioning system would be used as an interface with a connecting power grid 350.

The cargo would be stored ashore for distribution by either pipelines or surface transportation to the regional energy markets. Water would be taken aboard the vessels of the train from a storage facility 330 to be used for the Methanol Synthesis and Storage Systems 460 in fleet operations. The vessels would re-attach themselves to the designated flotilla and resume product production.

A similar operation would be performed by a $CO_2$ Train consisting of a Type 2 vessel FIG. 3B as lead vessel, FIG. 3C as the trailing "caboose" and other vessel(s) FIG. 3C as storage units to transport $CO_2$ absorbent KOH and return with sequestered $CO_2$ in the form of $K_2CO_3$ or $Na_2CO_3$ sources. This cargo is collected and stored in separate, isolated tankage, and together with supplies for fleet operation are loaded. Routine maintenance and repair actions requiring shore side attention are performed during or after the discharge of cargo. The cycle of operation is completed by the return of the vessel or vessels and re-attachment to a designated flotilla.

Major Systems Descriptions

Figure 4:
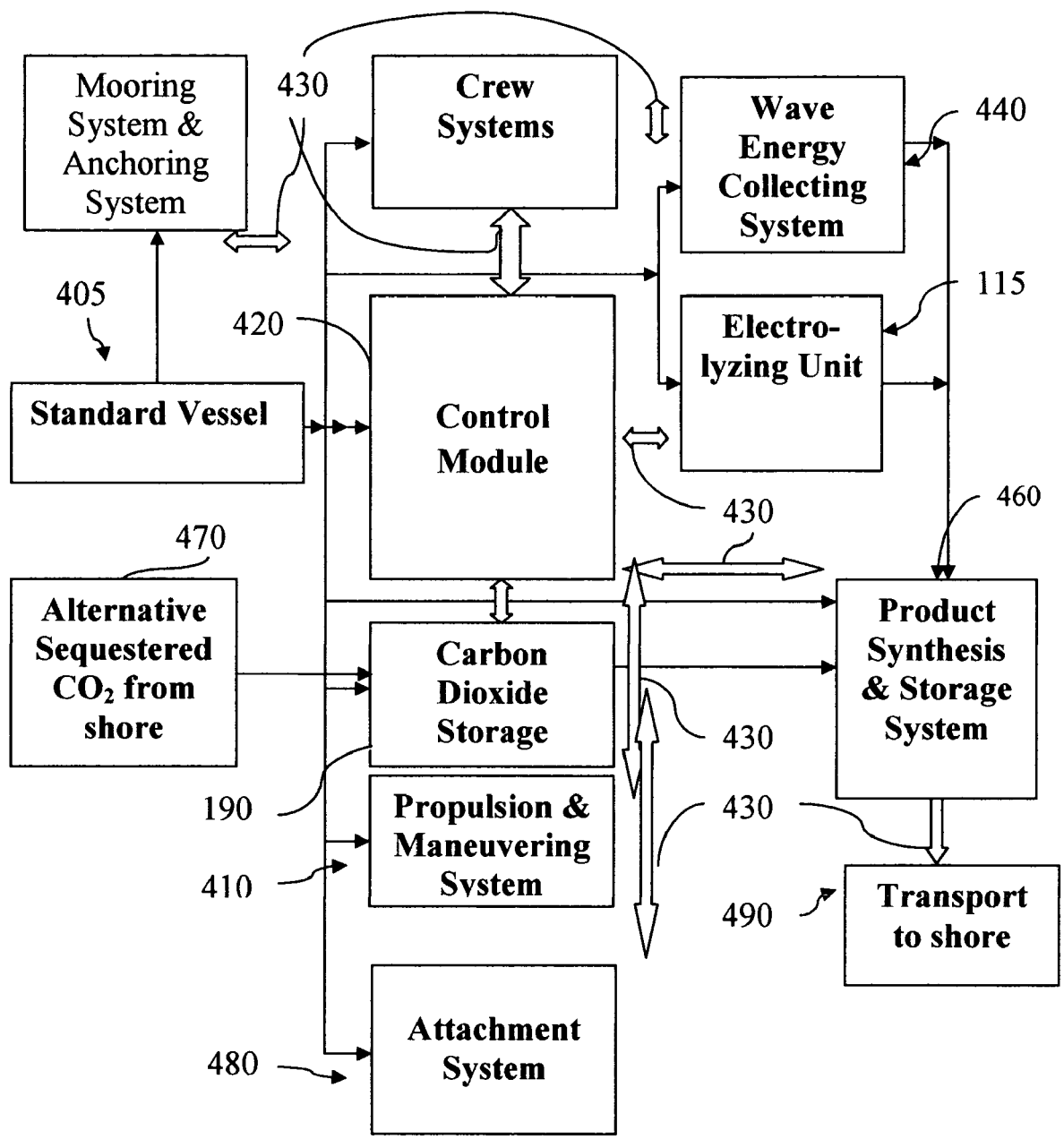
FIG. 4 Illustrates the major systems of a standard vessel.

To further illustrate this operation an arrangement of federated systems aboard these vessels is illustrated in FIG. 4. The interconnection of these systems is symbolized to indicate an exchange of data, command and control signals, electrical energy and chemicals in the execution of the operational plan.

It may be noted that these systems and subsystems may have both original and standard features that are needed in the performance of the required functions. In this regard, the total interoperation is considered to be unique and thus defined by the claims of this disclosure. In addition to the originality of the total interaction of these systems, certain major systems have had to be conceptually identified, and thus require additional recognition through the claims process.

The Standard Vessel Configuration

The concept of a "standard" vessel is meant to describe a means of creating and maintaining independent, self-contained fleets. Standardization in this context means that most of the vessels comprising this fleet have common dimensions of length, width and displacement and retain standard means of attachment and detachment.

Oceangoing vessels initially meeting these requirements may be typified by the McDonough Marine Service organization product line that meets the ocean service certifications of the U.S. Coast Guard and American Bureau of Shipping (ABS): The vessel size, is 200'×50'×13' and a loadline of 2600 tons. These dimensions are within the range suitable for the WEC concepts that presently exist 410. Modifications may be made to suit the stress loading requirements imposed by detailed designs of the fleet attachment systems under consideration. Also, special tankage would be required for the liquid cargo and feedstock. Trade studies would determine whether future specialized performance requirements would justify new, and optimized hydrodynamic designs as opposed to existing commercial designs.

The standard vessel concept should provide the cost savings obtained by "one design" construction. This concept was amply proven by the mass production demonstrated by the U.S. shipbuilding industry in production of the World War II Liberty and Victory dry cargo ships and the T-2 tankers that were built for the War Shipping Administration.

Standardization, also assists in the assurance of synergistic operation, thereby accomplishing in unity what they cannot do efficiently operating alone. In essence, this results in having an almost unlimited flexibility in accumulating and storing energy by varying the fleet size and location, and operate to perform a delivery of the product over relatively long ranges, perhaps hundreds of nautical miles, if necessary. This is accomplished without losing the mobility to deliver liquid cargo and without having to employ auxiliary tankers, and provide delivery to relatively shallow river ports. A preferred embodiment consists of free floating fleets that would achieve station keeping by combining their self-propulsion systems in joint dynamic positioning, an established maneuver used in the off-shore petroleum industry. This capability would achieve cost savings by not requiring installation of elaborate permanent anchoring systems by individual vessels. Permanent anchoring systems also include the costs end of service life recovery and repair of the sea bed. However, another embodiment does utilize a permanent mooring system for a fleet to be used in areas and during seasons where severe storms may be endemic and where dynamic positioning might result in an excessive fuel expenditure to maintain the fleet station location. In this embodiment, a single anchored mooring platform or a large vessel-to-anchor ratio would be maintained. In any case, the dynamic positioning system would be available as an adjunct to a minimum dependence on an anchoring/mooring arrangement.

Common Features

FIG. 4 typifies the embodiment of other major subsystems of a standard vessel than those described. Each vessel would be equipped with standardized attachment apparatus that would enable any vessel to "mate" with any other vessel in the fleet. Also included is a means of common connection and disconnection to the fleet electrical power bus and to the pumping and tankage systems so fluids (hydrocarbons, and/ or water) may be exchanged between vessels. It requires a common communication wired linkage between connected vessels and to maneuvering vessels via wireless, and, for the monitoring and control of operational systems within a vessel. Thus, all systems on all vessels could be monitored from a single vessel and even remotely controlled where practical. These monitoring systems would assist in limiting crew size by the delegation of work assignments to the fleet personnel on the basis of process monitoring and control, and fault detection and location using methods long employed on aircraft and modern industrial applications.

Crew Systems

The baseline configuration crew system module 332 is an added standard module for vessels of the particular type FIG. 3B that contains the required accommodations, galley, work stations, and all the features necessary for the efficient and safe berthing of crew for significant off shore service. As the vessel systems are almost entirely automated while on station, it is possible that a full complement of personnel on a vessel may only be required during transit to and from their ports-of-call with the crew adjusting to station keeping duties upon a return to the ocean station.

Propulsion

A propulsion method that is uniquely adaptable to conversion of a conventional ocean-going vessel to being both self-propelled and capable of employing dynamic positioning a station-keeping mode has been selected for the current embodiment. The preferred embodiment of vessels designated for self-contained propulsion/thruster operation would utilize units designed for outboard operation, and capable of full articulation and thrust control 410. The propulsion mounting design would preserve the potential for removal/reinstallation where required for changing fleet operations. The basic propulsive power would use fuel cell powered thruster technology in a preferred embodiment. Industrial grade, hydrogen powered fuel cells that are used in industrial applications to provide stand by power for utilities, gas pipelines and other uses are current examples of a maturing technology are candidates for this embodiment. The hydrogen would be obtained at one of the output terminals of the of the electrolyzing unit 115 and stored in a metal hydride equipped compartment.

A feature of this embodiment is the simplicity of installation and modification of acquired vessels in the implementation of the thruster pods 410 which could be externally mounted on the vessel hull. Full articulation would eliminate the need for fixed, thru hull drive shafts and the attendant complications of shaft alignment plus the need for a rudder assembly and hydraulic steering systems. Embodiments using other types of particular thruster/propulsion systems may be used to meet unique requirements. As the propulsion/thruster functions compete for space with the attachment systems on the stern or bow mid-ship locations, the propulsion and thruster functions may be divided between two smaller stern mounted units as opposed to an off-set single powered unit.

Examples of operational propulsion/thrusters are typified by the Thrustmaster Self Contained Hydraulic Driven Propulsion units, Transom-Mounted Hydraulic Thrusters; as well as the Hydraulic Marine Systems, Inc., Model T2416 Twin Hydraulic Thruster.

The Attachment Systems

Figure 5:
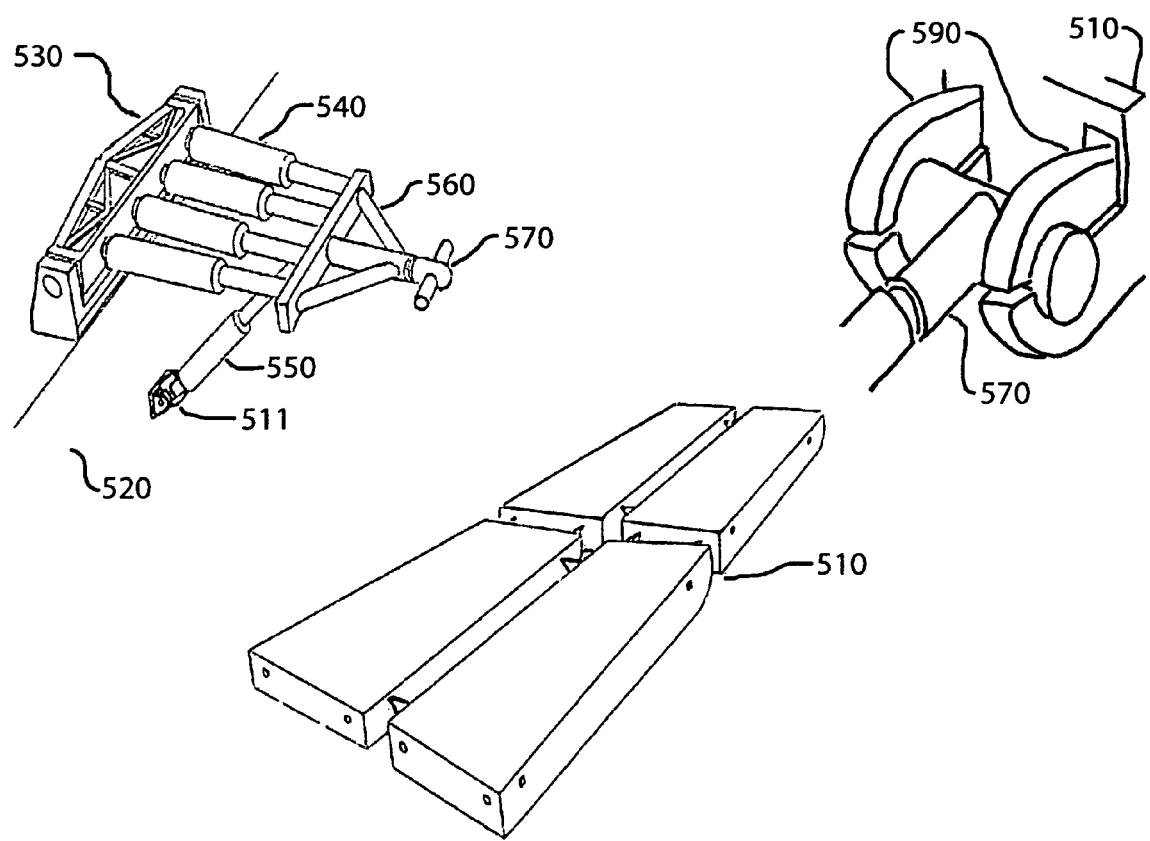
FIG. 5 Shows the coupler and articulated connector assembly.

An important aspect of the system described herein is the utilization of semi-automatic means of achieving attachment without excessive crew assistance. The fleet of vessels will be an assembly of units with standardized interconnection attachment mechanisms 500 as shown in FIG. 5. Each vessel will be provided with latching sockets located on the stern and starboard sides and attachment probes on the bow and port sides as shown in FIG. 5. The attachments will restrain relative motion in the lateral and longitudinal axes but allow relative movement in the roll, pitch and heave dimensions. Assembly of two or more vessels will constitute a train. Multiple trains may be connected using couplings provided on the fore and aft ends of the port side of the vessel and will couple into latches located appropriately on the starboard side of the adjacent train member. Each vessel will have a hydraulic cylinder assembly located midway between the coupling members each of which will couple with a latch embedded in the adjacent vessel such that any relative movement between the bodies of the floating units will extend or retract the piston in the hydraulic cylinder. This movement will result in pressurized flow of the working fluid from which energy can be harvested.

The restraining coupling members will be located near the bottom of the vessel and will have freedom of movement in the vertical axis but be restrained in the transverse axis. The coupling head will allow limited rotational freedom to accommodate relative roll between the vessels. The hydraulic cylinder(s) 520 will be mounted in an articulated structure high on the vessel midway between the restraining couplers. The articulated mount will allow rotation resulting from relative heave and roll. Relative pitch and heave changes will provide the action to pump the working fluid through the system.

Coupling Procedure

The coupling procedure involves the sequential alignment and latching of couplers to facilitate an orderly and safe assembly of the flotilla. The coupler 510 as assembled with 4 vessels of a flotilla is shown in FIG. 5. This articulated mounting 510 is shown for the hydraulic pumping elements. This mounting facility will have freedom of movement in two axes, vertical (Z) and lateral (Y) to accommodate relative heave and roll motion between vessels. The hydraulic pumping assembly 540 may be comprised of one or more individual cylinders. As the adjacent vessels respond to the heave of wave passage the pistons move into and out of the cylinders forcing fluid under pressure into the generating system. A hydraulic cylinder 550 is used to position the pumping assembly during attachment and then converted to an additional pumping member responding to relative heave, during power generation. A connecting member 540 is used to affix the pumping system to the adjacent vessel. This latching head snaps into the latch mechanism located on the adjacent vessel. This coupling is free to rotate around the longitudinal axis allowing relative roll between adjacent vessels. The latching function may be initiated by remotely opening the assembly. This standard latching mechanism may be initiated by allowing the coupling head 570 to enter and be captured by the moveable jaw 590. The locking and release will be controlled remotely. The movable jaw 590 opens to accommodate latching and unlatching. The mounting block 510 attaches the latching assembly to the structure of the connecting vessel. This mounting mechanism is common to all of the vessel interconnects. A two axis universal coupling mount 511 is provided for the positioning operation.

Using the vectoring thruster(s) on the incoming vessel the rigid (non-pumping) lower starboard coupling is brought into alignment with the open latch on the adjacent vessel.

Each attachment mechanism will be under control of a closed loop servomechanism system capable of detecting the free space location of mating components and positioning the probe for the final latching function to be completed. (not shown) Using the powered hydraulic coupling to manipulate the position of the vessel the remaining three rigid couplers will be connected. Finally, the second hydraulic pumping assembly on the port side will be coupled into place. The attachment components will be constructed of quality components of sufficient strength to withstand the excessive forces encountered during heavy seas. Some modification to the current standard vessel designs may be required to adequately distribute the forces encountered in operation.

Oceanographic Factors Influencing System Design

Figure 6:
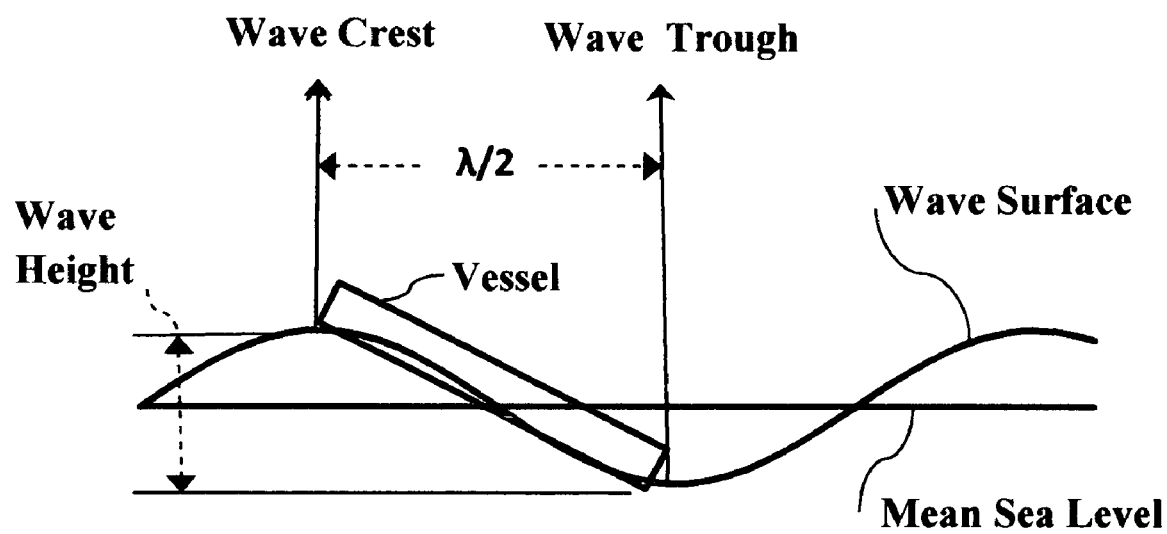
FIG. 6 Indicates the height, or amplitude of a wave that is measured from the crest to the trough, which corresponds to a half wave length of $\lambda/2$.

FIG. 6 illustrates the principles of wave energy conversion from free floating watercraft operation exposed to an open ocean environment. These principles constitute a basis for the wave energy collection concept employed in all embodiments of the invention. The figure indicates that the maximum height, or amplitude of a wave is measured from the crest to the trough, which corresponds to a half wavelength, $\lambda/2$. It is obvious that a float of this $\lambda/2$, or in this application a vessel, impacted by this wave would be at a maximum roll or pitch angle. A vessel in this condition is said to be in its "natural" resonant state.

A summary of useful components and nomenclature used in calculations of performance or sea state conditions are provided by the United States National Oceanographic and Atmospheric Agency (NOAA) and have been used in performance calculations with augmented calculations of one half wavelength and power density are shown in Table 1.

deployed in the winter months when longer wavelengths will be expected. Another example is that the fleet could be repositioned in the summer months further off shore to compensate for the expected reduction in power density nearer the coastal waters.

Fleet Descriptive Nomenclature

Figure 8A:
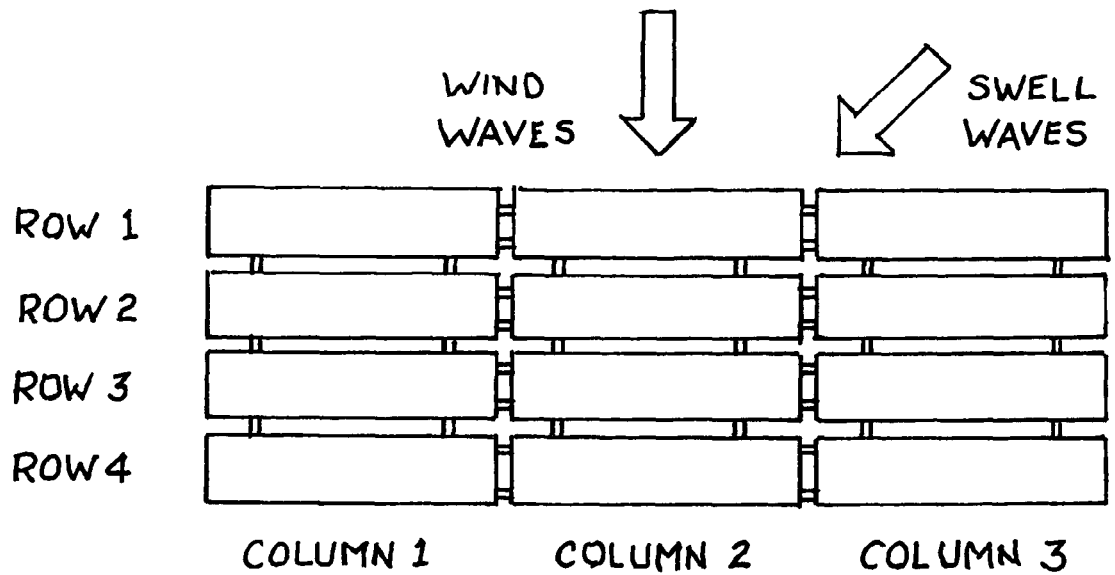
FIG. 8A Illustrates an example of a plurality of vessels comprising portions of a fleet and example attachment locations.
Figure 8B:
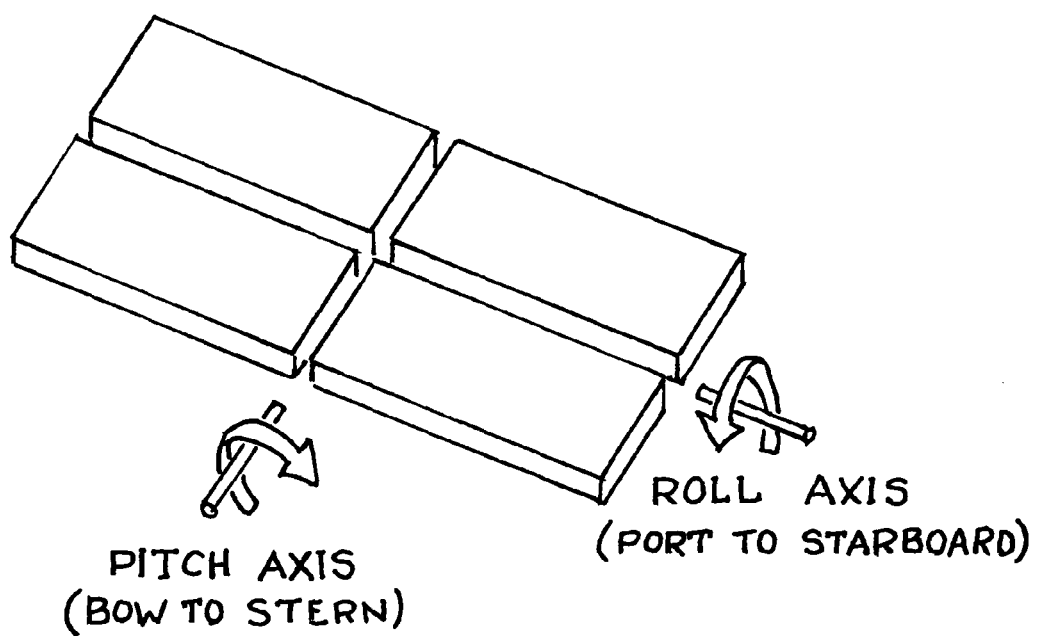
FIG. 8B Defines a column of vessels as sharing a "roll axis", while the longitudinally arranged vessels share a "pitch axis".

FIG. 8A illustrates an example of a plurality of vessels comprising portions of a fleet. The nomenclature adopted to illustrate fleet operations are to consider the vessels arranged in "rows" and "columns". Columns are illustrated as vessels addressed with transverse attachment, rows are arranged with longitudinal attachment. Therefore, as FIG. 8B illustrates, a column of vessels is said to share a "roll axis", while the longitudinally arranged vessels may be said to share a "pitch axis". WEC equipment is arranged to be engaged with the orthogonal components of the wind and swell waves and are summed and processed independently. The FIG. 8A illustrates an example of the fleet orientation to be maximally engaged with wind waves along the roll axis and with swell waves approaching at the off-broadside angle and projecting the X and Y components along the roll and pitch axes. It is noted that the wind waves tend to have shorter wavelengths and lesser amplitudes than the swell waves. It will be shown

TABLE 1

Example NOAA Data Listing of Wave Conditions, excepting calculated one-half Wavelength and power columns

| M M | D D | TIME (PDT) | WV HT ft | Sw H ft | Sw P sec | Swell Wave $\lambda/2$ m | Swell Wave Power, kW/m | SwD | W W H ft | W WP sec | wind wave $\lambda/2$ m | Wind Wave Power kW/m | W W D | W STEEP-NESS | A P D sec |
|---|---|---|---|---|---|---|---|---|---|---|---|---|---|---|---|
| 9 | 2 | 2:00 pm | 2 | 2 | 14.8 | 171 | 2.6 | WNW | 0.7 | 3.8 | 11 | 0.083 | W N W | N/A | 6.1 |
| 9 | 2 | 1:00 pm | 2 | 2 | 16 | 200 | 2.8 | WNW | 0.7 | 3.8 | 11 | 0.083 | W | N/A | 6.1 |
| 9 | 2 | 12:00 pm | 2 | 2 | 7.7 | 46 | 1.4 | WNW | 0.7 | 3.8 | 11 | 0.083 | W N W | N/A | 5.9 |
| 9 | 2 | 11:00 am | 2.3 | 2 | 7.7 | 46 | 1.4 | WNW | 0.7 | 3.6 | 10 | 0.078 | W | N/A | 5.8 |
| 9 | 2 | 10:00 am | 2.3 | 2 | 8.3 | 54 | 1.5 | WNW | 0.7 | 4 | 12 | 0.087 | W N W | N/A | 5.6 |
| 9 | 2 | 9:00 am | 2.3 | 2.3 | 8.3 | 54 | 2.0 | WNW | 1 | 4 | 12 | 0.178 | W N W | N/A | 5.7 |
| 9 | 2 | 8:00 am | 2.6 | 2.3 | 7.7 | 46 | 1.8 | WNW | 0.7 | 3.2 | 8 | 0.070 | W N W | N/A | 5.7 |

Figure 7A:
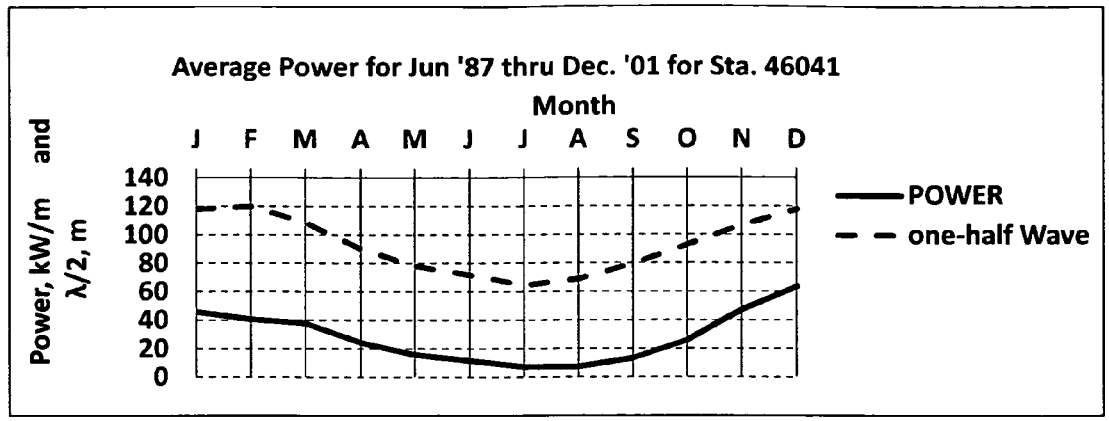
FIG. 7A-7C illustrates seasonal averages of power density at buoys positioned off the Washington and Oregon coasts of the United States which are used as examples of off shore wave conditions.
Figure 7B:
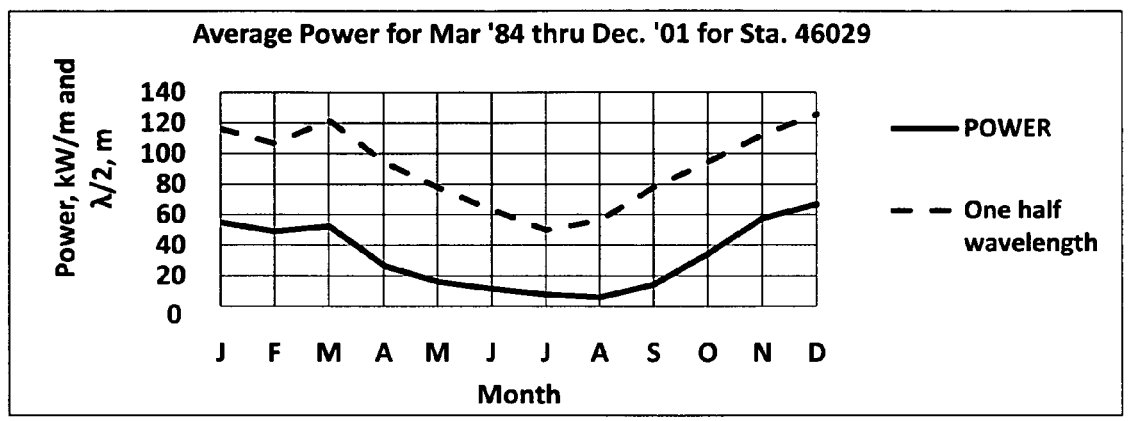
Figure 7C:
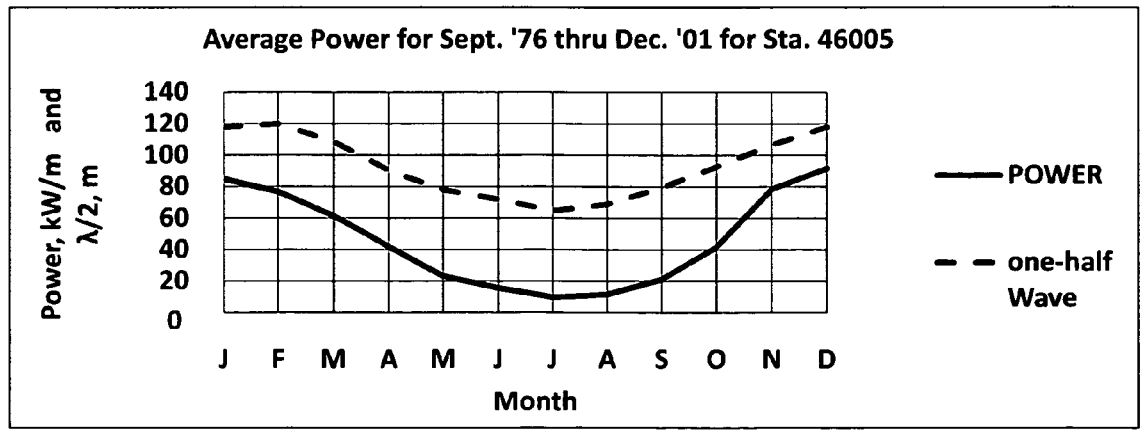

Those most significant to the calculation of WEC performance are: wind wave and swell wave power density, wavelength and direction at the points of measurement. FIG. 7 illustrates seasonal averages of power density at buoys positioned off the Washington and Oregon coasts of the United States which are used as examples of off shore wave conditions. Significantly, it is noted that monthly averages of the half wavelengths are approximately between 60 and 120 meters or in full wavelengths about 400 and 800 feet for the seasonally indicated periods. Hagen (6, 7) has used somewhat lesser figures for the North Atlantic coast of the United States: 100 and 300 feet. It is noted from FIG. 7 that multi-year averages for the buoy locations indicated progressively higher averages of the power density as the locations varied farther from shore to the Outer Banks of the Pacific Continental Shelf; and with almost a 2:1 difference in average power density levels for the indicated locations: Cape Elizabeth 45 nm NW of Aberdeen Wash., average power 28 kw/m of wavefront; Columbia River Bar, 20 nm W of river mouth, average power 31 kw/m of wavefront; 315 nm W of Aberdeen, Wash., average power 46 kw/m.

It also is significant that the seasonal average power density closely correlates with that of the average wavelength. It will be shown that there is great potential flexibility in the fleet composition in the number of vessels employed, as a function of the season and geographical location. For example, assuming a fixed number of vessels in a fleet, a larger number of vessels arranged in columns may more efficiently be that for the embodiment chosen that the fleet is automatically oriented to the direction producing the maximum sum of the waveform components. An exception to this rule is when the wind or wave amplitudes exceed the operational limits, and the fleet would then become aligned with the longitudinal axis into the waves for safe operations.

Wave Energy Conversion

An Overview

Four embodiments of means to achieve the optimization of wave energy conversion (WEC) in this implementation of ocean-based energy collection: 1) Observation and Manual Control; 2) Delayed Correlation Control; 3) Least Mean Square (LMS) Adaptive Filter Control and 4) an Integration of Manual and Adaptive Filter Control.

As previously shown in FIG. 6 the height, or amplitude of a wave that is measured from the crest to the trough, which corresponds to a half wave length of $\lambda/2$. In this application a vessel impacted by the wave would be at a maximum roll or pitch angle and at the "natural resonance" state for wave $\lambda$. However, ocean waves contain a randomly varying spectrum of wavelengths, amplitudes, phases and directions.

Optimum performance is obtained by achieving resonance between these particular wave components and the vessels. In these embodiments resonance is obtained for a spectrum of wavelengths of a wave by a combination of choosing the optimum physical dimensions of the vessels and a means of controlling the stiffness of the inter-vessel coupling systems which modulates segments of the vessels to appear to an impending wave as a resonant length. Ballast tanks are employed to assist in bringing the mass estimates of the vessel within limits imposed by the resonance control functions. It is recognized that as liquid cargos are produced and stored in the tanks of the vessels of the fleet, their centers of gravity will be changing. Therefore, an important feature of these embodiments is the ability to compensate for their resonant states on a continuous basis and thus maintain resonances throughout the fleet.

The preferred vessels for the alternative resonant achieving embodiments are the standard barge and the catamaran designs.

Orthogonal Processing

Another important feature of these embodiments are to enable the processing of ocean waves from any direction by the use of the principle of "orthogonal channels", ie., independent conversion channels for the roll (transverse) and pitch (longitudinal) axes. As the vessels are normally attached in rows and columns, the hydraulic pumps driving electrical generators that are incorporated into the Attachment Systems shown in FIG. 9 can process the orthogonal components of waves encountered from any direction and then optimally combined.

Wave Characterization

The said proposed embodiments to achieve the optimum wave energy conversion control can be applied independently or in combination and have certain features in common: All of these proposed methods utilize the equivalence of the operation of the fleets of the vessels to that of certain electrical networks, namely, transversal, finite impulse response (FIR) filters. Next, all use characterizations (digital sampling) of the impending wave fronts for either manual adjustment to achieve near resonance or automatic resonance adaptation. Different means may be used for this characterization, however. Finally, these data may be used as input for statistical processing of performance assessments of selected fleet segments or the entire fleet. This information may be displayed in the form of power spectral situation displays for the Observation and Manual Control mode, and as input to the correlation processors used in the Delayed Correlation Control and the LMS Adaptive Filter Control embodiments and a hybrid combination of the first and third method embodiments. The principal of digital wave characterization and the use of the vessel transfer functions as equivalent filter elements may be applied to many useful algorithms available from electrical network applications and are not restricted to the said embodiments.

It will be shown that there is great potential flexibility in the fleet composition in the number of vessels employed, as a function of the season and geographical location. For example, assuming a fixed number of vessels in a fleet, a larger number of vessels arranged in columns may be more efficiently deployed in the winter months when longer wavelengths will be expected. Another example is that the fleet could be repositioned in the summer months further off shore to compensate for the expected reduction in power spectral density nearer the coastal waters Resonance Through Vessel Coupling Stiffness Control As an exemplification of an optimum transference of energy from a WEC 440 it is useful to consider a segment of a plurality (a fleet) of vessels for purposes of analysis. It is further assumed that vessels be allowed the freedom to rotate about their roll and pitch axes as typified in FIG. 8B. The wave action creates motion between the vessels and is converted to hydraulic, and then, electrical energy from a regulated generator. The significance of this assembly to a discussion of resonance control is to explain how stiffness is controlled from electrical inputs to the inter-vessel coupling assembly.

The backpressure on the hydraulic cylinders of the WEC 440 may be controlled to create this variable "stiffness" in the mechanical coupling between vessels. The pitch hydraulic pump assembly 920 consists of a set of two per vessel with three pumps per unit. The roll hydraulic pump assembly 920 also consists of a set of two per vessel with three pumps each.

Figure 9:
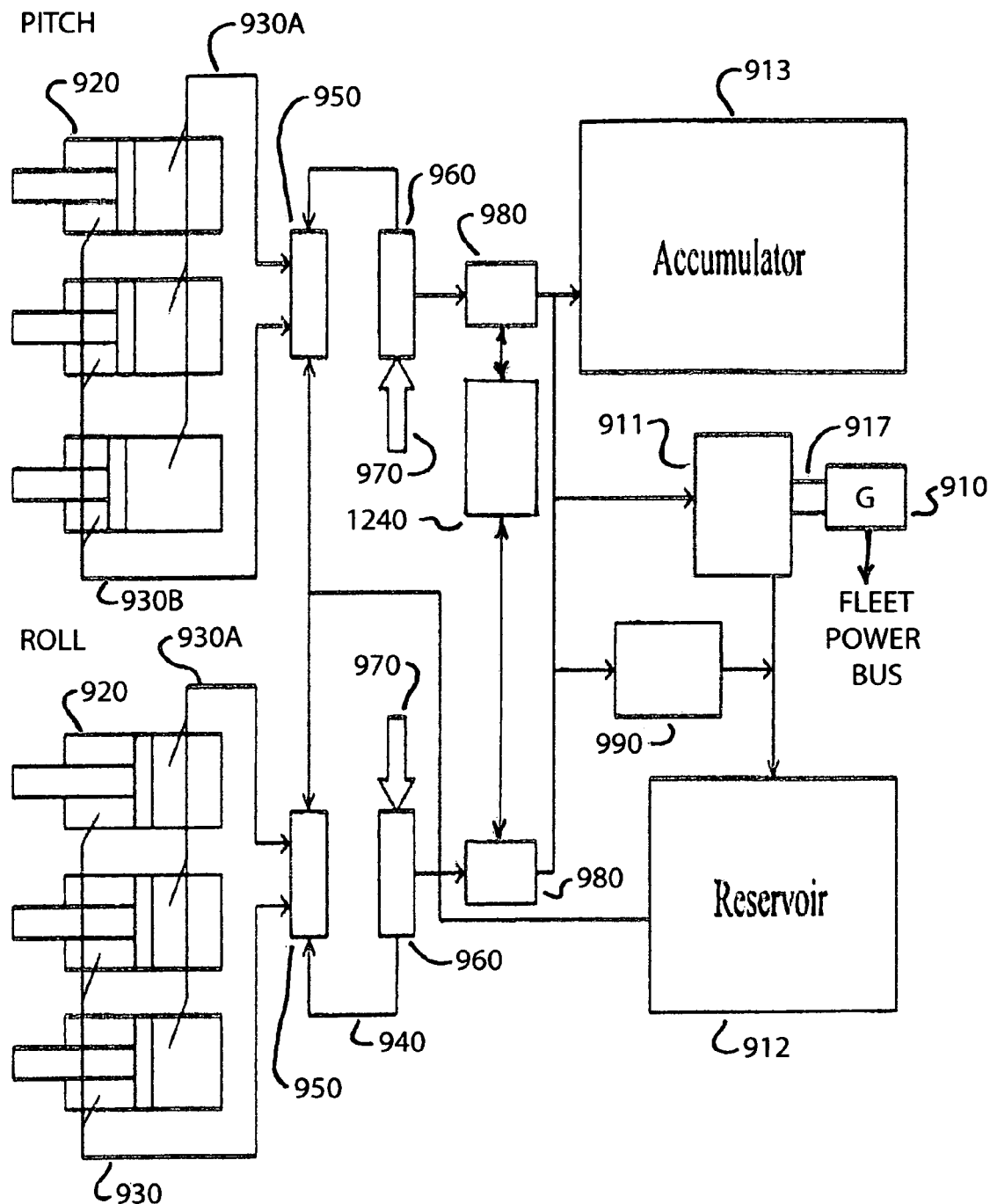
FIG. 9 Illustrates how variable stiffness is accomplished in the mechanical coupling between vessels.

FIG. 9 illustrates how this is accomplished by a servo loop which consists of a flow control valve 960, a hydraulic by-pass return 940 the pump cylinder valve return 930A and 930B and a stiffness control vector Input 970 to the flow control valve 950. This loop manages output to a system accumulator 913 and hydraulic motor 911, thus varying the apparent mass of a vessel to each wave passage.

The outputs of the pitch and roll flow sensors 980 resulting from this differential vessel movement represents the energy extracted from each wave passage and the values transmitted on the inter-vessel data bus. A designated system control module 420 accesses these data for use in the controlling actions. Subsequently, an electrical signal representing a required bias to the Flow Control Valve 960 is received from this Control Module 420 on the basis of an assessment of the required regulation to achieve maximum conversion of the differential motion between the vessels to electrical energy delivered to the Intrafleet Electrical Power Bus 1220. Operating components are connected by hydraulic lines 930 and 940, all sized for volume and pressure by those experienced in the field. A hydraulic motor 911 is connected with shaft 917 to an electric generator 910.

A Simplified Example of Resonance Through the Inter-Vessel Stiffness Control

Figure 10:
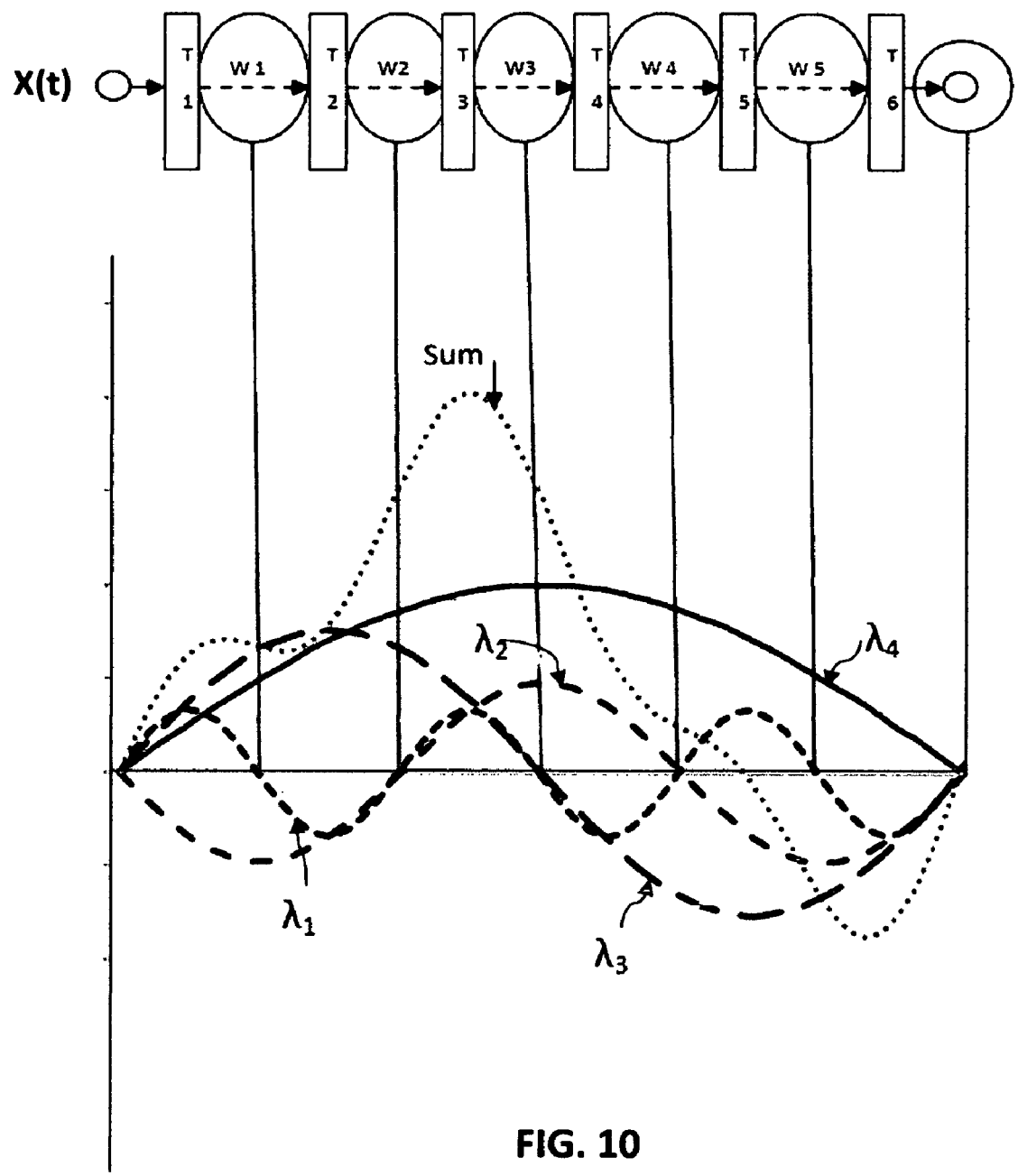
FIG. 10 Illustrates a hypothetical segment of a row or column of vessels used to illustrate the principle of achieving resonance to the components of a complex wave train.

FIG. 10 illustrates a hypothetical segment of a row or column of vessels used to illustrate the principle of achieving resonance to the components of a complex wave train. This simplified example considers a column of vessels having typical length and width dimensions of 200 feet by 50 feet. The stiffness features are controlled to either minimum or maximum values. The minimum value allows unrestricted rotation in synchronism with the wave movement, while the maximum value restricts movement to a minimum between designated vessels. These limits to the values of stiffness may be normalized and represented as "coefficients of stiffness", $w_1, w_2, w_3, \ldots w_n$ with values ranging from 0 to 1.

If the coefficients were all set to the values shown in Table 2 at the sampling times $t_1, t_2, t_3, \ldots t_6$, the segment of vessels would resonate at wavelengths determined by their physical dimensions. In this example the column of vessels are all connected beam-to-beam which are 50 feet in width and, therefore, resonate to waves that are 100 feet in length or at frequencies which are $2\pi/t_0$

TABLE 2

Example Weighting Multipliers for Coefficients of Stiffness

| Wave Number | $w_1$ | $w_2$ | $w_3$ | $w_4$ | $w_5$ | $w_6$ |
|---|---|---|---|---|---|---|
| $\lambda_1$ | 0 | 0 | 0 | 0 | 0 | 0 |
| $\lambda_2$ | 1 | 0 | 1 | 0 | 1 | 0 |
| $\lambda_3$ | 1 | 1 | 0 | 1 | 1 | 0 |
| $\lambda_4$ | 1 | 1 | 1 | 1 | 1 | 0 | radians/second as shown in the graph of $\lambda_1(t)$. The term $t_0$ indicates the time for a wave front to transit the width of the vessel. Similarly, FIG. 10 indicates that resonance to the $\lambda_2$=200 foot wavelength component would be achieved by setting coupling coefficients $w_1$, $w_3$, and $w_5$ to 1.0. Likewise, $\lambda_3$=300 feet may be resonated with $w_1$, $w_2$, $w_4$, and $w_5$ set to 1.0. Finally, the entire set of coefficients set to 1.0 will enable the column of 6 vessels, each with a width of 50 feet, to resonate with a 600 foot wave component. Therefore, the number of vessels in a row or column that would be required to capture the energy in a typical waveform is determined from the estimate of the shortest and the longest wave components of interest for the two orthogonal axes of alignment.

To achieve mechanical resonance for a particular wavelength, both stiffness and inertia must be cancelled at the resonant point for maximum power transfer from the incident waves. As inertia is a function of the mass of the vessels plus its cargo, it must also be considered in the design. This term may be varied by adding or subtracting ballast as part of the resonance adjustment. The idea is to minimize both the stiffness and inertia terms with respect to the loading of the power transfer devices of the vessels. In this embodiment, the adjustment of ballast can assist the resonance process by bringing it within range of what can be achieved by varying the stiffness. However, only the stiffness factor is varied in the present design in real time which would cancel the inertia value at the spectral resonant point. In an analogy with the "tuning" of electrical systems it may be considered equivalent to holding the inductance of a resonant circuit constant and varying the capacitance to minimize the circuit reactance.

A Statistical Approach to Achieve Adaptive Resonance

If the components of the wave structure were added together as shown in FIG. 10, intermediate values of the coefficients would be required to maximize the electrical power at the output power bus. In a practical case, a wave would consist of a composite set of components having random wavelengths, amplitudes, phases and wave duration. Clearly, optimal conversion of these continuous, random wave forms could benefit from a statistical processing approach. As opposed to designing the network of vessels to resonate with fixed, selected wavelengths as previously described, a practical system may be designed to make the "best fit" over an expected randomly varying spectrum of wavelengths and wave directions. The processing approaches described in subsequent paragraphs are intended to support the present system concept that favors standard sized vessels or floats that can be used for multiple tasks. These tasks would include energy conversion, storage, processing, and transportation thus achieving economies of scale through the principle of the use of common hull design and compatible systems. If the principle of "natural resonance" previously described is employed, the principles based on using arrays of fixed float dimensions as taught by Hagen [6], [7], and Cockrell, [19], or by mechanical "tuning" of floats or attached cavities as in Talya [15], McCormick [20] and other sources, would not be suitable for the applications addressed herein.

For example, prominent features of this invention are 1) the ability to convert ocean energy to a chemical form as well as transport this product to ports-of-call without assistance from auxiliary vessels such as tankers or tugs; and 2) be independent from permanently tethered positions permitting positioning to optimize energy conversion and 3) adjust fleet assets to accommodate marketing needs.

Digital Processing as a Means of Achieving Statistical Sampling of Wave Data

The use of readily available hardware and software tools provide a practical means of processing the complex representations of ocean waves and their effect on ocean vessels. The approach taken in this embodiment makes use of both time and frequency domain processing methods. The signals in this application refer to continuously acquired samples of the impending waves that are exciting the rows and columns of the subject fleet of vessels and the response to this excitation also expressed in digital format. The key to this analysis is the representation of the linked transfer functions of the vessels constituting segments of the rows and columns of the fleet to be analyzed as equivalent, composite finite impulse response filters (FIR) (28). Equivalent analysis may be performed based on infinite impulse response (IIR). FIR applications are more common as they are usually applied where practical applications have bounded frequency limits.

A Concise Description of the Sampling Theorem

The transversal, FIR filters used in these applications require the representations of the inputs from the said WEC apparatus to be in a quantized form based on an application of the Sampling Theorem [22]. The importance of the theorem is in the realization that no a priori knowledge of the parameters of the ocean waveform is required for processing as long as at least two samples for each cycle of the waveform may be obtained at the shortest time interval of interest or at twice the highest radial frequency component to be sampled. In other words, any waveform sampled at twice the highest frequency $f_0$ or at the equivalent sampling interval $t_0=2\pi/f_0$ can represent this waveform in subsequent processing operations. Reference 22, and other standard texts on information theory and signal processing, give more background and examples that may be useful in a review of the said processes. A waveform thus sampled may be referred to as "characterized".

Relevance to Wave Energy Conversion

In applying the said principle to this application the measure of $t_0$ is the sampling interval previously described as the duration of a wave front to transit the width of the standard vessel. The vessel sizes and sampling times described in FIG. 10 may be considered as an example: If one only needs to sample ocean wave lengths equal to or greater than 100 feet, a vessel width no smaller than 50 feet is required. This is in agreement with the heuristic proposal or simplified example in FIG. 10 of mechanical resonance. It also means that we can construct a transversal FIR filter consisting of a tapped delay line with tap spacing equal to $t_0$ and weighting coefficients $w_n$ at each tap which is analogous to the description of the transit times and amplitude samples of a wave front passing through a segment of vessels. In other words, any processing of such a filter would represent equivalent processing of the representation of the generator outputs of the said segment of vessels. The minimum number of taps and weighting coefficients needed to characterize the signal is then equal to $2T/t_0$, where T is equal to the transit time of a wave through the segment of vessels being analyzed.

Similar relations exist for processing the wave components encountered in the pitch axis, as well, although one would probably sample it at the same sampling time as used in the roll dimension as the pitch channels of vessels might include some shorter wavelength components as well as the longer ones expected from the swell waves.

Manual Resonance Adjustment Method

These principles may be applied to the embodiments to be described: The first, The Manual Resonance Adjustment method shown in FIG. 12 may be used as an independent embodiment of adaptive resonance or as a monitoring aid and override control of the automatic methods to be described subsequently. It is considered that this capability should be available as a safety and backup procedure and as a reasonable check on overall operations.

Characterization of the Reference Signal

Briefly, a characterization of an incoming wave may be obtained by sampling the analog representation of a wave by one of several wave recording systems to be described. The wave sensor and characterization, is a measurement system, 1201, that obtains two samples of the shortest wave to be processed significant to the wave conversion process of this invention and other data preparation. The measurements are transferred to the intrafleet data bus 430 which may be transmitted by cable while the vessel segment is attached to the fleet, and/or by wireless when the affected flotilla is separated from the fleet. The intrafleet data bus 430 is the medium for collecting these and others for processing by elements of a computer processor 1202, which include modules 1260, and 1210.

Determination of the Power Spectrum of the Wave Samples

Figure 11:
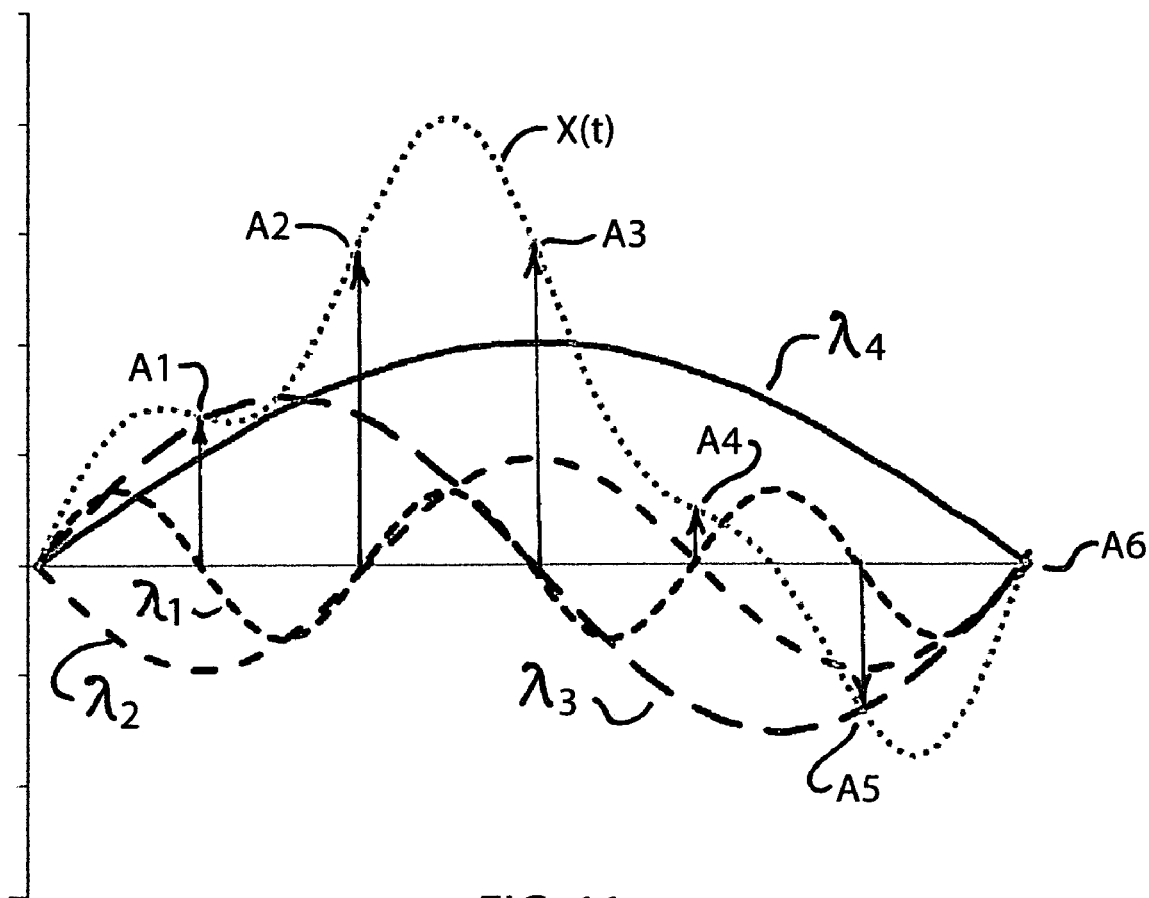
FIG. 11 Illustrates how an adequate sampling frequency of the incoming wave is used to determine the power spectrum of the composite wave and thus the relative power in its components.
Figure 12:
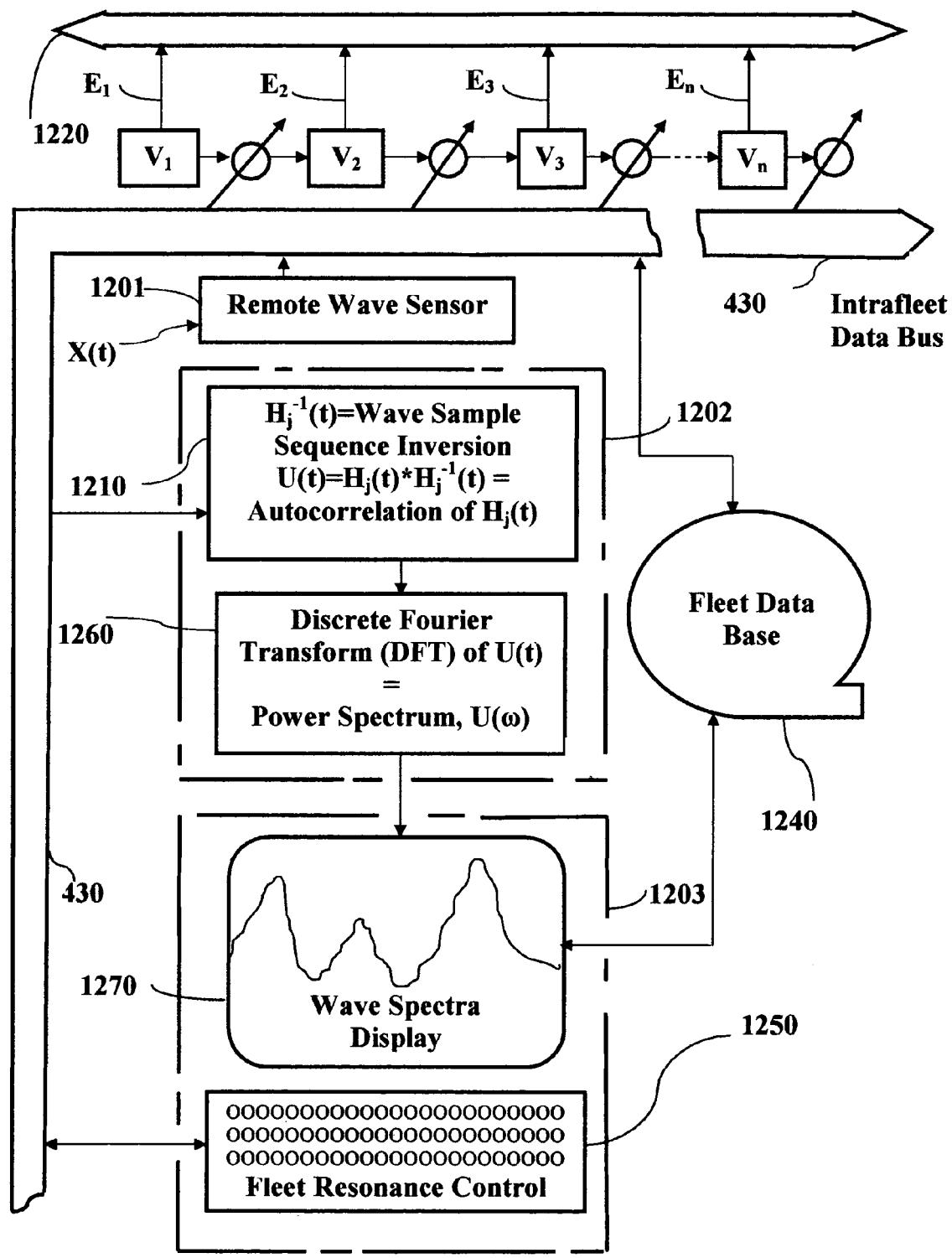
FIG. 12 Shows The Manual Resonance Adjustment method for adaptive resonance or as a monitoring aid and override control of automatic methods.

To illustrate the characterization of an incoming wave front impinging upon a selected segment of the fleet a hypothetical composite wave, for convenience X(t) of FIG. 12, is chosen. This is first created by summing the components of this incoming wave, from those previously analyzed in this figure over an interval of the wave duration. These samples $A_1$, $A_2 \ldots A_6$ are taken at every sample time, $t_j$, over the length of the wave and compiled as shown in FIGS. 11, 12 and Table 2 and compiled by the Wave Sample Sequence Inversion Module 1210. These samples typify how they may then be used to optimize a resonant response of the WEC systems of the fleet to the impinging wave fronts.

The objective of this sampling of the incoming wave is to determine the power spectrum of the composite wave and thus the relative power in its components, for example $\lambda_1$, $\lambda_2 \ldots \lambda_6$ as shown in FIG. 11. On this basis an operator would know the waveform composition of the incoming waves from vessel segments of the fleet. With this information the operator can select from a stored data base 1260 the appropriate weights to create resonances based on the displayed fleet spectra.

The power spectrum (or spectral density function) is calculated in a two step process well known to practitioners of electrical filter design:

First, a matched filter, is formed on a computer module 1210, using a resident software program to perform autocorrelation U(t)[22][25], of an incoming waveform segment of X(t), in this example, $H_j(t)$. The matched filter in its simplest form is merely a transverse filter (a tapped delay line) with the normalized sample points $A_1, A_2, \ldots A_j$, obtained from the characterization of an incoming wave segment, H(t), and become the weighting coefficients $w_1, w_2 \ldots w_j$ shown for example in FIG. 11 and Table 3. These weighting coefficients are obtained by arranging them in an inverse order from the wave amplitude samples, $A_1, A_2, \ldots A_j$, at the delay line taps. The matched filter thus formed, $H_j^{-1}(t)$, is coupled to the original waveform segment, $H_j$ and whose output is its autocorrelation function, U(t).

2) Next, this process is followed by performing a discrete Fourier transform (DFT), performed on another resident program 1260 which translates the autocorrelation, U(t), to the power spectrum, U(ω) (or in its normalized form, the spectral density function (SPD) 1270, [30]. This operation creates a display of the frequency of the components of an incoming wave on the Wave Spectra display 1270. It is noted that correlation processing and DFT computer software programs are readily available from engineering software supply organizations.

TABLE 3

Characterization of the Incoming Wave Front, and Matched Filter Synthesis

Normalized Sample Points for Wave, X(t) = $H_j$

| A1 | A2 | A3 | A4 | A5 | A6 |
|---|---|---|---|---|---|
| 0.7 | 1.48 | 1.46 | 0.27 | −0.63 | 0 |

Coefficients of Stiffness for Matched Filter, $H_j^{-1}$

| W1 | W2 | W3 | W4 | W5 | W6 |
|---|---|---|---|---|---|
| 0 | −0.63 | 0.27 | 1.46 | 1.48 | 0.7 |

Operation of the Fleet Wave Assessment and Resonance Control Modules

In this Manual WEC control method a responsibility is assigned to the operator of the designated control vessel to select and process the rows and columns of the desired sector(s) from the entire contiguous vessel fleet to compute the power spectra of their sea states. FIG. 12 illustrates the interaction of the various components of this operation. A Fleet Wave Resonance Control Console 1250 would display spectral density functions in conjunction with a map of the vessel locations using data from the common fleet data bus 430. Therefore, information is available to set pre-programmed control functions to activate or deactivate the desired fleet resonance conditions by transmitting the appropriate inter-vessel stiffening controls to the vessel flow bypass valves 970 of the attachment systems. The wave power spectra 1270 would be displayed as a function of wavelength or radial frequency. Standard resonance profiles would be stored in the Fleet Data Base computer 1260 and would adjust the stiffness weights of the vessels of the selected segments to match those displayed on the Control Monitor 1250 in accordance with an operational control strategy. This strategy also might involve the use of weather forecasts and coordination with other fleets or disconnected segments of the fleet. It is expected that these various surveillance strategies could be programmed to automatically perform the scanning of the fleet and take certain pre-programmed actions on the basis of observed data.

Delayed Correlation Concept

Figure 13:
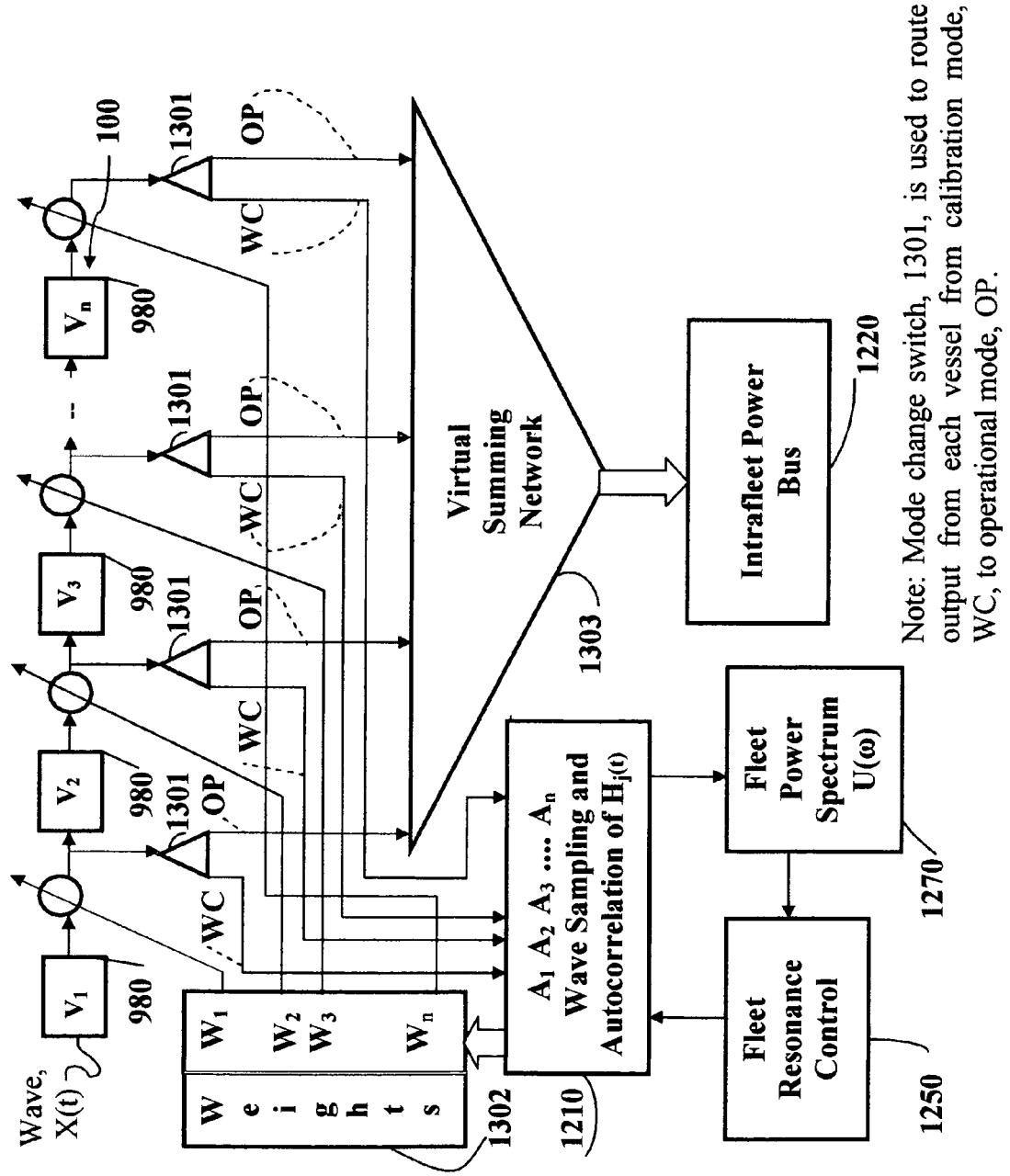
FIG. 13 Shows the configuration for stiffness controls for automatic resonance adjustment.

In this embodiment, a near optimum virtual filter is positioned at the input terminals of the stiffness controls of a set of vessels chosen for automatic resonance adjustment. This virtual filter is comprised of the combined transfer functions of a row or column of the individual vessels and arranged to provide a best estimate for the transfer of power from the vessel differential motion to the electrical output bus. The weighting functions in this case are used directly as inputs to the stiffness controls of the inter-vessel Attachment Systems. The configuration is shown in FIG. 13.

The filter is synthesized by the following actions which are similar in concept to those used in the Manual Resonance Control method previously described, however with this significant difference: the use of the vessels themselves as being integral parts of "virtual" transverse filters", $H_j$, in each row and column of the selected sector of vessels. The procedure is as follows:

1. The stiffness controls are placed in the minimum stiffness position and the Weight Calibration (WC/OP) 1301 switches placed in the WC position.

2. An incoming wave, X(t) provides an excitation to the row and column segments of vessels resulting in a characterization of outputs from the flow sensors 980 which is a representation of the output from each vessel generator. This characterization is performed in the manner shown in FIG. 13. Each sensor provides a hydraulic flow amplitude electrical signal, $F_n$, to the processing center for each of the vessels under an automatic resonance adjustment. Wave characterization is determined by the following procedure. The link to each vessel is set to minimum stiffness. Flow sensors 980 are commanded to start sending values, Fn, representing wave heights at a commanded time interval $\Delta j$. The processor will begin storing in its memory, Fn and matching tj values for each $\Delta j$ when all flow sensors 980 of the set of vessels are producing signals. The signals are representative of wave heights, $A(n,tj) = \Sigma(Fn-Fn-1)$ for n=1 to N, N is a certain number of vessels and for $t=T_0$ to $T_S$ where $T_0$ is the time that processor memory begins to store said data and $T_S$ is the time when the processor has determined a certain number of crests have been accumulated from the first vessel, n=1, facing the impinging wave front The processor will determine weighting coefficients based on a characterized wave from the matrix of values $A(n,tj)$. The sampling will be stopped at a certain time depending upon a certain number of wave crests having passed the first vessel closest to the impinging wave front. The values, $A(n,tj)$, are sent to the processing center 420 which integrates the sequenced amplitude segments to form the vessel digital output signals for the duration of the wave, $T \leq T_s - T_0$, and subsequent waves. These output waveforms occur at sampling times, $t_j$. These samples, $A_{nj}$, become the weighting functions of a virtual transverse filter, $H_j$. The uniqueness of this embodiment is that the tapped delay line used in the virtual transverse filter, $H_j$, consists of the chain of the vessel transfer functions themselves with the tap delay intervals equal to $t_0$, as previously mentioned, the time required for the wave front to transit a width or length of a vessel in the segment.

3. The WC/OP 1301 switches are placed in the OP position, and $H_j$ is transformed into its conjugate form, $H_j^{-1}$, by reversing the order of the weighting factors, $A_j$. This is accomplished first by a Wave Sampling Processing Module, 1210, and further by a Weight Processing Module, 1302 which now constitute a virtual matched filter as shown in FIG. 13.

4. The weighting factors, $w_j$ are converted to the appropriate hydraulic control module 1302 commands and transferred to the stiffness controls of the flow control valves of the vessel Coupling System 480 via the Intrafleet Data Bus 430.

5. By convolving $X_j * H_j^{-1}$ the finite time cross correlation function is formed which provides for a maximum power transfer at a time $t_n$ After formatting the virtual matched filter the stiffness settings are set for the next wave front changing into the WC mode again. The assumption is that the next wave will be similar to the preceding one and a useful relationship between the virtual matched filter and the succeeding wave will occur and thus perform an efficient transfer of its energy to the electrical output bus.

This process concentrates the output power in the last sampling interval of the incoming waveform. This peak power is efficiently leveled by utilizing the Electrolyzing Unit 115 for use by the systems dependent on the fleet power bus for all vessel functions. Other embodiments may be used to provide the function of peak power leveling.

The outputs from "virtual" vessel matched filter can be processed in a similar manner to that as previously described in the operation as shown in FIG. 12, by the use of a control and display monitor 1250 in the same or similar device to that performed by the Manual Resonance Control embodiment shown in FIG. 12.

It should be noted that the "training function" provided by the characterization of the output from the individual "unstressed" or WC mode of the $H_j$ more closely relates to the true excitation function of the impinging wave event than one that used by the previously described Manual Resonant embodiment as it is derived from the lee of vessels closer to the impinging wave front than if it was derived from an unobstructed, dedicated sensor previously described.

It also is noted that the efficiency of the Delayed Correlation embodiment depends upon how effectively the oncoming wave is correlated with its predecessor, which is a reasonable assumption.

The sequences described by both of the previously described embodiments are repeated either sequentially, in parallel or combinations of both depending on the processing loading of the designated vessel to perform the Control and Monitor function of module 1250.

LMS Adaptive Filtering Method

The previous methods required a priori information based on the preceding wave event that defined the settings of the stiffness controls of the vessel coupling before the resonance adaption of the fleet began. The LMS Adaptive Filtering method is based on the Widrow-Hoff Least Mean Square Error algorithm [23, 24, 27] and is completely automatic and enacted approximately in real time. Variations on this method are universally used in modern data transmission and channel equalization, acoustical and radio frequency noise cancellation, antenna sidelobe suppression, telephone echo suppression and many other applications. This embodiment also may be understood as an analogy with conventional electrical network theory to achieve the goal of efficient energy conversion over a wide range of expected wavelengths.

An Overview

Figure 14:
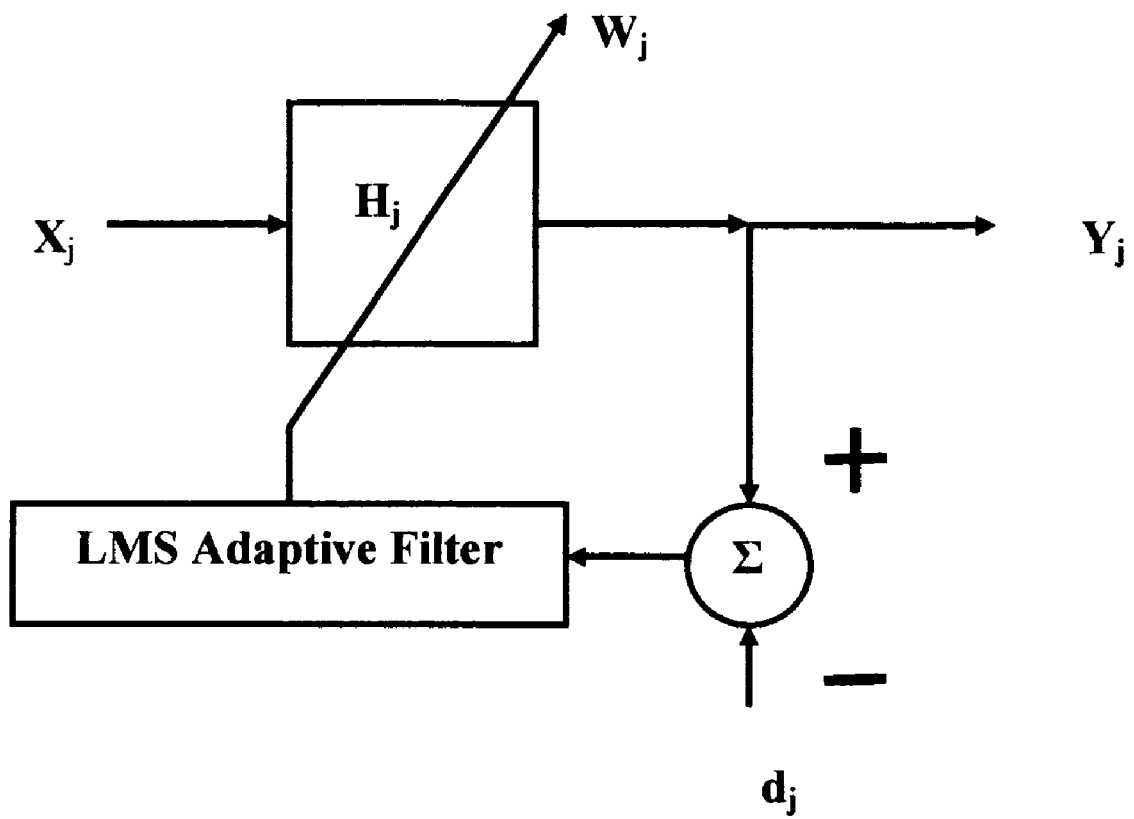
FIG. 14 is an overview of the LMS adaptive filtering method.

An overview of the embodiment is illustrated in the block diagram of FIG. 14. As in the previous said embodiments a segment of a column or row of vessels is shown as an equivalent finite impulse filter (FIR), $H_j$, assuming a time sampling index of j with an input from a wave, $X_j$ and an output $y_j$ representing the sum of the roll or pitch flow sensor outputs. The filter $H_j$ assumes a composite weighting coefficient, $w_j$, which adjusts the stiffening controls of the vessels thus effecting the electrical output, $y_j$, and a characterization of the incoming wave, $d_j$, thereby, maximizing the wave energy conversion.

Configuration Description

Employing the convention illustrated by FIG. 8, the vessels also are coupled together along their transverse (roll) axes which constitute columns, and their longitudinal (pitch) axes are coupled together to form rows as described in said Manual, and Delayed Correlation WEC embodiments. In the preferred embodiment of the LMS Adaptive Resonance embodiment, FIG. 15, an equivalent transversal FIR filter, $H_j$ is formed by a union of a designated segment of said columns or rows and functional elements of a designated control and monitoring computer 1250. Each vessel in a segment may be considered as an element of a virtual tapped delay line of $H_j$ with the WEC electrical output of each vessel corresponding to component of an output vector $X_j$. Within each WEC this component is provided by the hydraulic flow sensors 980 in a sampled data form at timing intervals corresponding to the wavefront transit times described in FIG. 11 and employed in the Delayed Correlation embodiment previously described.

This output vector $X_1$, becomes the input set of values of the signals at the delay line taps at the LMS Adaptive Filter.

$$X_j^T = [x_j, x_{j-1}, \ldots, x_{j-n+1}],$$

The component $x_{0j}$ is a constant, normally set to the value of +1

Figure 15:
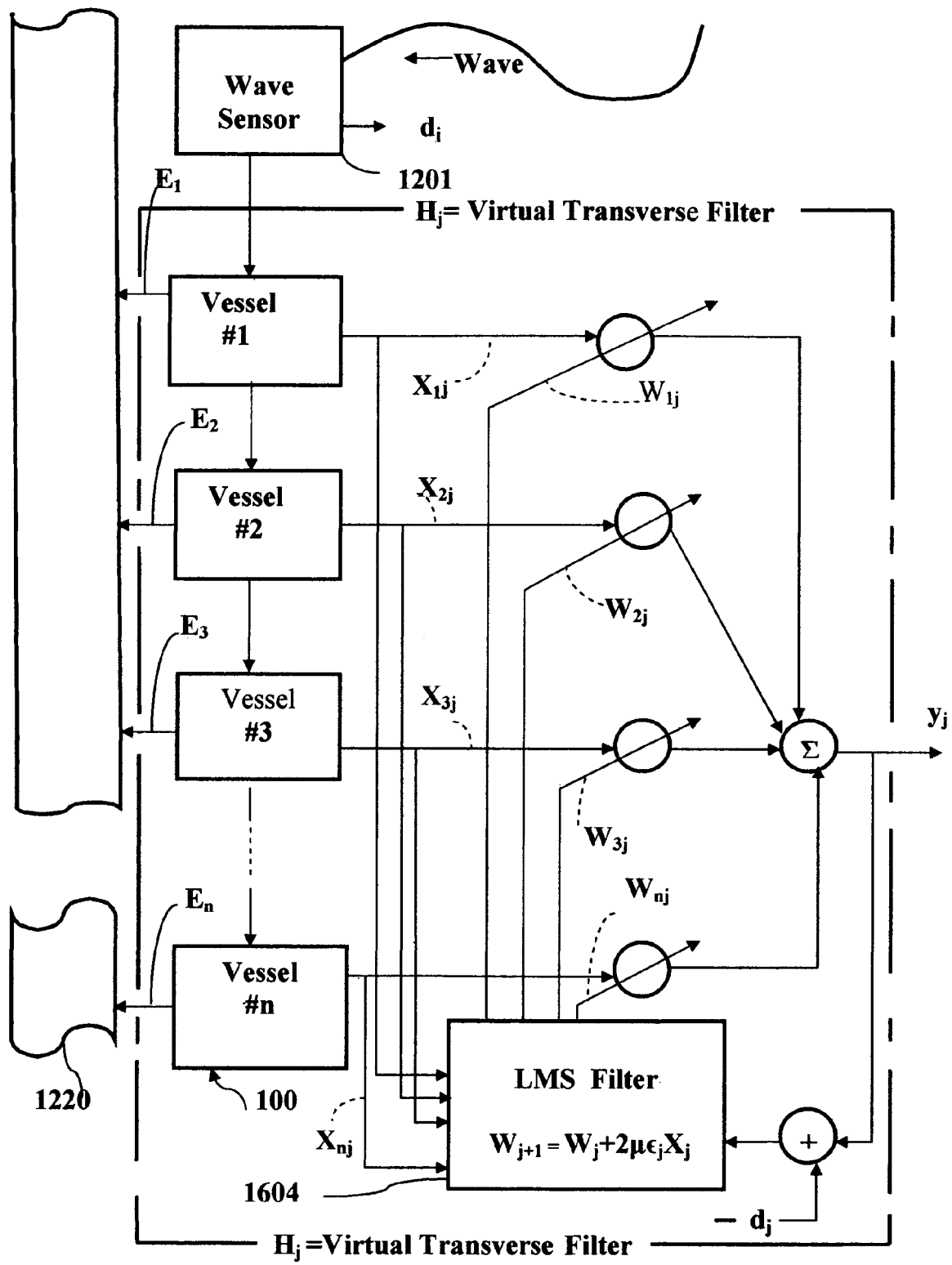
FIG. 15 Shows the formation and functional elements an equivalent transversal FIR filter.

These functional elements are shown connected as in FIG. 15 The input signal elements of $X_j$ are arranged to appear simultaneously on all input lines LMS Adaptive Filter at discrete times indexed by the subscript $j$.

The wave X(t) also engages the vessel Wave Sensor that provides a delayed characterization of the training signal, $d_j$ and transmitted to the said inter-vessel data bus 430 to be used by the LMS adaptive filter.

$W_j$ is a column vector of filter weights at the time of the $j^{th}$ iteration cycle $$W_j^T = [w_{0j}, w_{1j}, w_{2j}, \ldots, w_{nj}]$$

where $w_0$ is the bias weight.

These weights are adjustable as symbolized in FIG. 15 at each port of $H_j$ and described in the figure by circles with arrows through them. These weights of $W_j$ are sequentially transmitted back to the individual vessel WEC roll and pitch stiffness interface 970.

The output of the transversal filter $H_j$ 1602 is $$y_j = X_j^T W_j$$

which represents the actual electrical power available for transmission to the intrafleet Electrical Power Bus 1220. The error signal, $$e_j = d_j - y_j,$$

is shown as the difference between the training signal $d_j$ and the virtual filter response $y_j$.

This error signal, in turn, is processed by the LMS adaptive filter 1604. This embodiment performs a successive estimation of the error between $y_j$ and the output from a segment of a row or column of vessels in the manner previously described, and the "desired signal" or training signal, $d_j$.

The means of execution of the LMS algorithm may be performed by a "stand alone" LMS algorithm digital processor or equivalent functional elements of the control and monitoring module 420. For purposes of consistency, the latter option was chosen, [28, 29].

The iterative steps defined to follow are controlled by a system clock which runs at the said sampling frequency, $2f_0$, described in the previous embodiments. The string of processing samples to be described is stored in a tapped delay line which is formed by software residing in the control and monitoring module 420.

A cycle may be described as starting at j=1. The instantaneous output of the hydraulic flow sensors of the vessel WEC systems each generator of the vessels is represented by the vector component, $x_{nj}$ of vector $X_j$. Each desired signal component of $W_j$ is assumed to appear simultaneously on all input lines $x_1, \ldots x_n$ 1605 of the LMS adaptive filter 1604 at discrete times indexed by the subscript $j$.

The weight vectors $w_0, w_1, \ldots w_n$ are adjustable as symbolized in the figure at each port The LMS algorithm of Widrow and Hoff is $$W_{j+1} = W_j + 2\mu e_j X_j;$$

$\mu$ is a small positive constant that is chosen by experience from results obtained during pre-deployment testing procedures and may be in the range of 0.01 to 0.3.

The LMS algorithm updates at the input sampling rate. The output of the adaptive filter ports are the next adjusted weight value at (j+1) and a process is continued with succeeding clock iterations. Thus, the LMS algorithm iteratively updates the weighting coefficients and feeds them sequentially through the fleet inter-vessel data bus 1240 to the equivalent FIR filter, $H_j$. The cycle is complete when inputs are delivered to the stiffness control command ports 970 of the WEC as shown in FIG. 9.

As successive processing intervals follow, the error $e_j$, approaches its minimum value. Ideally, this error is reduced to approach a theoretical value, the "Weiner Solution", or the Mean Square Error. This corresponds to the time that $y_j$ reaches its maximum value. The convergence time of the LMS algorithm depends on the step size. If it is small, convergence will take a longer time but with a correspondingly lower mean square error. If it is too large, it may become unstable and not converge at all.

Physical Realizability Issues

In certain LMS filter applications it is necessary to insert a fixed delay between the $X_j$ and $d_j$ data streams to insure statistical independence between the successive sets of coefficients. A fixed delay is assumed necessary in the present embodiment and is incorporated into the wave sensor assembly 1210 shown in FIG. 15.

Overview of Combined Manual and LMS Resonance Control Configuration

Figure 16:
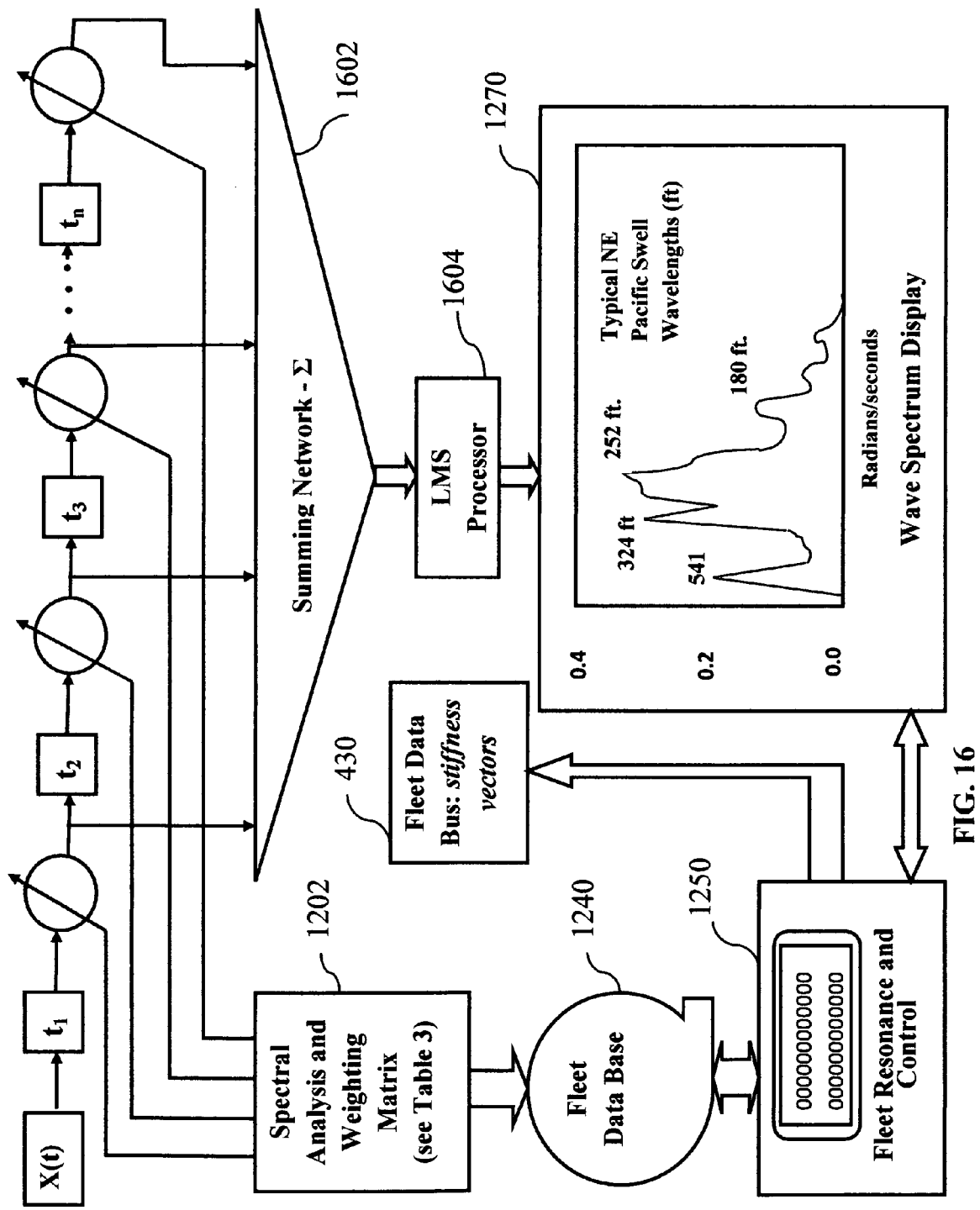
FIG. 16 illustrates an overview of common display and processors comprising an integrated design.

FIG. 16 further illustrates the commonality between the two configurations to illustrate major interfaces. To further illustrate the common use of processing equipment between the two WEC configurations typified by FIGS. 12 and 15. The principal interfaces between the Manual and LMS WEC configurations are shown in FIG. 16. Common systems include the Fleet Data Base 1260, Wave Spectra Display 1270, Fleet Resonance Control 1250.

A preferred embodiment of the LMS Resonance Control embodiment would apply an integration of the LMS Resonance Control configuration with the Manual Resonance Control embodiment, FIG. 12. It is apparent that some form of overview and auxiliary means of control would be required to maintain system reliability and safety margins of operations. Most of the functional operations of the LMS Resonance Control Configuration would reside in software design which could be incorporated in the said Manual Resonance Control embodiment computer design 1260, 1270 in the form of additional software and hardware modules as required with little extra cost. FIG. 16 illustrates an overview of common display and processors comprising an integrated design.

Characterization of the Wave Input, the Training Signal

As previously mentioned the Manual Resonance Adjustment and the LMS Adaptive Resonance embodiments that have been presented require a "training signal" derived from the impending wave fronts for obtaining adaptive resonance optimization. In these applications real-time sampling of the incident waves for the roll and pitch axes are required. Two embodiments are described. The functional descriptions of a means of characterization are not limited to these described. Implementation may vary depending upon the requirements of those experienced in this field.

a.) Chambered Float

This passive option is an example of a means of performing a characterization of the ocean wave. It is proposed to make use of an enclosed chamber open to the sea from the bottom which contains a float with nominal mass with respect to the vessel where it is being used. The float would contain a stabilized, inertial platform similar to that required to stabilize video cameras and computer games (an example is the Wii controller which is provided by the Nintendo Company) which would be free to record absolute vertical movement independent of the vessel motion. Its movement is recorded as an excursion from a datum location plotted against a clock and would be transmitted by wireless to the adjacent collecting station, formatted and distributed to the users via the Intrafleet Data Bus 430. Permanent mountings on the vessels could be used or perhaps deployed on demand as the chambered float could be made with modest dimensions. It is likely that there will be other sources employing other methods which would be available, as this function should be required in other applications requiring wave measurement from a moving platform such as a vessel.

b). Submerged, Weighted Line

A weighted line of such length as not to be influenced by the wave action and whose top end would exceed expected wave heights and which contains a wave height sensor of some means can be used. The means of sensing can vary, from an optical laser to other means.

Adaptive Orientation of the Barge Fleet to the Prevailing Wave Fronts

Since simultaneous wave energy conversion is performed by the roll and pitch conversion channels steering controls may be derived for optimum fleet orientation. FIG. 8 illustrates an example of fleet orientation considering orthogonal signals obtained by using the column and row components of a wind wave and a swell wave. Since these orthogonal channels are continuously being compared and combined, it may be apparent that directional sense may be derived from simple algorithms that may be used to automatically optimize the fleet orientation to the impinging wave fronts. Where wind waves prevailed the fleet would tend to favor the roll axis. Conversely, if the longer wavelength swell waves prevailed, the fleet would tend to favor the pitch axis until shadowing caused by the vessels nearest to the impending wave front limited their WEC effectiveness.

Passive Orientation Control

Figure 17:
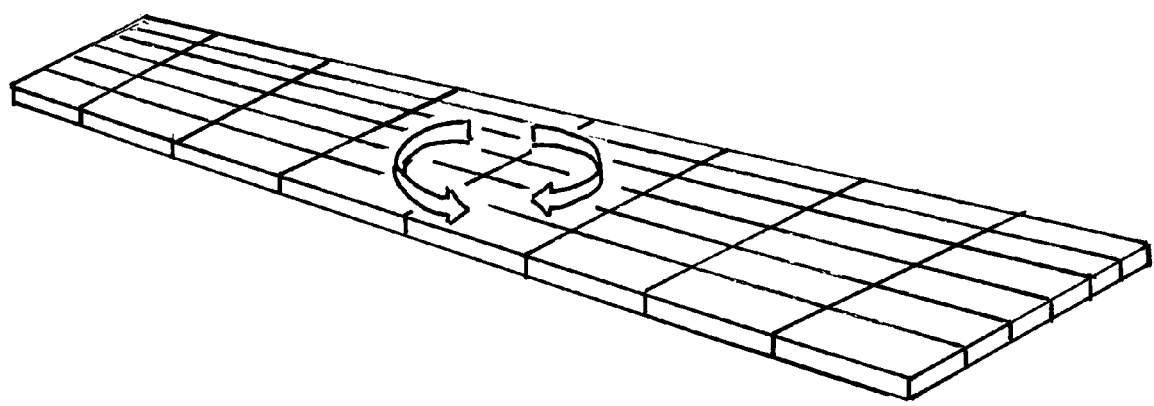
FIG. 17 Illustrates wave front orientation control of the fleet that is passively performed by differentially pivoting around a mid-point axis.

The wave front orientation control of the fleet may be passively performed by differentially pivoting around a midpoint axis as shown in FIG. 17. This maneuver would negate the need to expend fuel for powered tracking. For example, if a turn to starboard is required, the stiffness in the coupling between vessels in the starboard segment is increased as contrasted between the port segment, and the differential wave pressure will force the vessels into a clockwise movement. Conversely, a similar move would be performed for a counterclockwise movement.

The Preferred Embodiment

A number of alternate means of meeting the functional goals have been presented in the description of this invention. The preferred embodiments for each major apparatus or process are offered as follows:

System Energy Storage Medium, FIG. 2

Molecular hydrogen ($H_2$) is the energy storage medium chosen as the embodiment of choice as opposed to that of electrical energy stored in ultracapacitors or hybrid ultracapacitor/batteries.

The approach to the production of $H_2$ may be performed by the electrolysis of make-up water from shore facilities such as river water or from municipal sources, or by desalinating sea water. Make-up water from shore facilities is the preferred source of $H_2$.

Methanol was chosen as the basic medium for storing $H_2$ as opposed to a higher hydrocarbon form.

Sequestered $CO_2$ recovered from the atmosphere, Potassium Carbonate ($K_2CO_3$) is the primary source of $CO_2$ with a secondary source of sequestered $CO_2$ from shore side industrial plants where economically available.

Station Location Maintenance

Dynamic positioning is the basic station location maintenance method used with permanent anchoring/mooring facilities as back-up.

Wave Energy Conversion:

The Least Mean Squares (LMS) Adaptive Resonance in an integrated form with the Manual Resonance Control method as shown in FIG. 16 is the preferred embodiment.

The Chambered Float is the preferred means of obtaining a characterization of the wave motion as a reference medium for wave energy conversion.

The Barge is the preferred embodiment of a vessel. It is a common and proven product that can be expected to provide economies of scale.

CONCLUSIONS

National authorities have emphasized the need to establish independence from foreign petroleum sources as they become depleted or otherwise unobtainable. The practically unlimited energy resources of the oceans of the world have been identified along with other candidates as potential sources of alternate energy to supply this demand. Many organizations have proposed means of exploitation of ocean resources and some are in development. However, detriments to deployment have been encountered, and unless considered may limit their potential to achieve, operational status. Coastal and near-coastal tidal, thermal and in-stream current extraction methods of ocean energy exploitation have or will encounter problems of overcoming a public perception of environmental destruction, visual impairment, impact on commercial fishing and recreational uses. Ultimately, there will be a limitation of the number of sites available for this purpose. One particular application of wave energy conversion (WEC) that has up to now not been addressed in detail is the recovery of wave energy from the more remote sections of the coastal resources, the Continental Outer Shelf (OCS). Advantages over coastal implementations are: (1) wave energy density is greater in the OCS locations; (2) no apparent competition with other alternate energy embodiments including wind turbines; (3) minimal or no visual impairment. Disadvantages are the limitation caused by costly submarine cable connections to the energy grid, greater distances to the power grid interfaces. The embodiments described herein overcome these obstacles by eliminating or a least minimizing anchoring systems requirements for each float of a WEC system; (2) eliminating submerged power cables by converting wave energy to a hydrocarbon compound; (3) using rather than creating $CO_2$ effluent, (4) easier maintenance due to vessel access to shore establishments; (5) flexibility of the fleet to change the size and locations of the fleets as markets change. Further, the system makes better use of existing common facilities and personnel trained to perform energy conversion, storage, transportation and distribution of this energy in either chemical or electrical form. The latter embodiment would be conditioned upon the future technical and economical development of bulk electrical storage devices.

At present a network of transportation systems is used to distribute methanol in the United States including 92% by barges, 7% by rail cars and 1% by tanker trucks which can be expanded as the market for this alternate form of energy increases. Reference [13] describes how an entire economy could be based on this expansion. Prominent examples of this include a transition to methanol-gasoline mixtures (M85), flex-fueled internal combustion powered vehicles; dimethyl ether (an excellent synthetic diesel fuel variation of the methanol production embodiment); proton exchange membrane fuel cell powered automobiles; synthetic J7/J8 jet fuel; combined cycle turbines to replace natural gas for stationary electrical power generation; and as feed stock for the plastics industries. The proposed embodiments meet the potential demand for this energy form.

We claim:

1. A system of vessels for conversion of energy from wave motion of water comprising:
   a) a means for semi-automatic attachment and detachment of said vessels are arranged as fleets consisting of contiguous rows with bow-to-stem attachments, and
   b) a contiguous columns of vessels in a roll dimension, with vessels attached port-to-starboard and all vessels in a heave dimension; said contiguous row and columns provide orthogonal wave energy conversion providing essentially continuous directional to both wind and swell waves;
   c) a means of position-keeping by dynamic positioning where designated vessels having self-propulsion for said dynamic positioning and cargo transportation to ports-of-call;
   d) wherein said vessels form an articulated structure employing the use of said vessels in such a way as providing conversion and storage of said ocean energy from the differential motion existing between the vessels to hydraulic, electrical and chemical forms, respectively;
   e) an apparatus for analyses of wind wave and swell waves impinging on a fleet having randomly occurring wavelengths spectra, phases, amplitudes and directions and permitting adaption of said vessel resonance features to achieve optimum energy transfer;
   f) a designated pairs of vessels that may aggregate, transport and distribute said stored chemicals or electrical energy to ports-of-call and return with sequestered carbon dioxide and supplies to recover portions of the energy expended during transportation;
   g) a means for providing electrical energy to perform electrolysis and chemical processes for creation of chemicals useful for storing hydrogen, and for creation of hydrocarbon products and for providing storage of said electrical energy in capacitors commonly referred to as ultra-capacitors or in hybrid ultra-capacitor-storage batteries.

2. The vessels according to claim 1 are further linked by a common electrical bus to transfer the electrical power and a facilities to transfer liquid cargo, chemicals and water from one vessel to another dependent upon the commands of a designated vessel control center.

3. The vessels according to claim 1 assembled from a standard barges modified to enhance the efficiency or reduce the cost of implementation.

4. The vessels according to claim 1, where said articulated, outboard mounted propulsion systems are capable of being re-installed or removed from said vessels to meet the changing of said fleet requirements without major re-building efforts of said vessels, and
   a) said propulsion systems are used for said dynamic positioning of the fleet and powering designated vessels for transportation of cargo to ports-of call and fleet refurbishment of chemicals and supplies; including
   b) a means for adjustments to number of said vessels installed with propulsion systems due to seasonal weather requirements; and
   c) a hybrid combination of said dynamic positioning and use of a centrally located said vessel of a said fleet moored to a permanent anchoring system when operating at the appropriate depth.

5. The vessels according to claim 1 are capable to react to the relative motion between the vessels activating hydraulic links to pump hydraulic fluids through a system and include its flow management, storage and conversion components comprising:
   a) a means for releasing fluid flow from said storage reservoir through hydraulic motors;
   b) a means for driving said electrical generators which are coupled to a common fleet electrical bus.

6. The vessels according to claim 5 capable to obtain said characterization of the said wave amplitude and time samples of said wave impingement on the said plurality of vessels selected for use in the achievement of adaptive resonance requires an autocorrelation process, followed by a discrete Fourier transform providing a means for display of said wave power spectrum with
   a means for temporary storage, and time inversion of the said samples of the characterized wave.

7. The vessels according to claim 1 further process orthogonal components of the impending waves within the rows and columns of the fleet and individually summed and provide a means for composite fleet directional control to maximize wave energy conversion.

* * * * *